(12) United States Patent
Zubrin et al.

(10) Patent No.: US 7,931,712 B2
(45) Date of Patent: Apr. 26, 2011

(54) NATURAL GAS STEAM REFORMING METHOD WITH LINEAR COUNTERCURRENT HEAT EXCHANGER

(75) Inventors: Robert M Zubrin, Golden, CO (US); Sam G Michael, Parker, CO (US); Gevorg Sargsyan, Lakewood, CO (US)

(73) Assignee: Pioneer Energy Inc., Lakewood, CO (US)

( * ) Notice: Subject to any disclaimer, the term of this patent is extended or adjusted under 35 U.S.C. 154(b) by 0 days.

(21) Appl. No.: 12/943,834

(22) Filed: Nov. 10, 2010

(65) Prior Publication Data
US 2011/0046244 A1      Feb. 24, 2011

Related U.S. Application Data

(63) Continuation of application No. 12/902,143, filed on Oct. 11, 2010, which is a continuation-in-part of application No. 12/165,585, filed on Jun. 30, 2008, now Pat. No. 7,810,565, which is a continuation of application No. 11/751,028, filed on May 20, 2007, now Pat. No. 7,650,939.

(51) Int. Cl.
| | |
|---|---|
| *B01J 7/00* | (2006.01) |
| *H01M 8/06* | (2006.01) |
| *C01B 3/36* | (2006.01) |
| *C01B 6/24* | (2006.01) |
| *C01B 3/02* | (2006.01) |
| *C01B 3/24* | (2006.01) |
| *C01B 3/26* | (2006.01) |
| *C10J 3/46* | (2006.01) |

(52) U.S. Cl. ....... 48/197 R; 48/61; 423/644; 423/648.1; 423/650; 423/651

(58) Field of Classification Search .......... 48/61, 197 R; 423/644, 648.1, 650, 651
See application file for complete search history.

(56) References Cited

U.S. PATENT DOCUMENTS

| 5,458,857 | A | 10/1995 | Collins et al. | |
|---|---|---|---|---|
| 6,159,434 | A * | 12/2000 | Gonjo et al. | 422/626 |
| 6,413,479 | B1 * | 7/2002 | Kudo et al. | 422/198 |
| 6,506,359 | B1 * | 1/2003 | Maruko | 423/648.1 |

(Continued)

Primary Examiner — Alexa D Neckel
Assistant Examiner — Matthew J Merkling
(74) Attorney, Agent, or Firm — American Patent Agency; Daniar Hussain

(57) ABSTRACT

The present invention is a natural gas steam reforming method for generating an output gas mixture of carbon dioxide and hydrogen, including the following steps. (1) Combusting a portion of the natural gas with an oxidizing agent to generate heat, superheated steam, and a gas mixture of carbon dioxide, carbon monoxide, and hydrogen. (2) Steam reforming the gas mixture with additional superheated steam under steam-rich conditions to transform a remaining portion of the natural gas into carbon dioxide, carbon monoxide, and hydrogen. (3) Water-gas-shifting any residual carbon monoxide into additional carbon dioxide and additional hydrogen by utilizing a water-gas-shift catalyst downstream of the steam reforming step, thereby producing an effluent gas mixture that is predominantly carbon dioxide and hydrogen. (4) Boiling water in a top-to-bottom linear countercurrent heat exchanger to generate the superheated steam by transferring heat released in the water-gas-shifting step, where as the water is gravitationally and thermally stratified from top to bottom with a top portion boiling into steam, the steam continues to rise and is additionally heated in the top-to-bottom linear countercurrent heat exchanger. (5) And, utilizing the superheated steam produced as a reactant in the steam reforming step and the water-gas-shifting step to assist in reformation of the natural gas into carbon dioxide and hydrogen.

20 Claims, 17 Drawing Sheets

U.S. PATENT DOCUMENTS

| | | | |
|---|---|---|---|
| 6,986,797 B1 * | 1/2006 | Clawson et al. | 48/102 A |
| 7,066,973 B1 * | 6/2006 | Bentley et al. | 48/197 R |
| 7,156,886 B2 * | 1/2007 | Nakamura et al. | 48/127.9 |
| RE39,675 E * | 6/2007 | Kudo et al. | 422/198 |
| 2002/0083646 A1 * | 7/2002 | Deshpande et al. | 48/197 FM |
| 2002/0090327 A1 * | 7/2002 | Deshpande | 422/190 |
| 2003/0051405 A1 * | 3/2003 | Childress et al. | 48/127.9 |

* cited by examiner

1700

| Date: | 6/14/2010 | | Start Time: | 10:45 PM | | | | | Gevorg Sargsyan | | | | | | | | | | |
|---|---|---|---|---|---|---|---|---|---|---|---|---|---|---|---|---|---|---|---|
| | Temperature | | | | | | | | | | SLPM | | | GC Results | | | | | %-Conv. |
| Time | TC_2 | TC_3 | TC_4 | TC_5 | TC_6 | TC_9 | TC_10 | TC_11 | TC_12 | PT_1 | P_O2 | P_CH4 | Air | CH4 | O2 | H2 | CH4 | CO2 | CO | # | |
| 11:20 | 608 | 451 | 387 | 224 | 105 | 105 | 87 | 268 | 707 | 5 | 100 | 100 | 32 | 26 | 17 | 52.4 | 20.8 | 14 | 13 | 1 | 56% |
| 11:40 | 553 | 457 | 405 | 277 | 120 | 121 | 147 | 344 | 695 | 25 | 100 | 100 | 30 | 26.2 | 17.3 | 62.8 | 11 | 21.2 | 4.5 | 2 | 70% |
| 11:53 | 587 | 478 | 429 | 301 | 121 | 120 | 150 | 365 | 708 | 26 | 100 | 100 | 29 | 26.3 | 17.3 | 60.9 | 11.8 | 20.9 | 6.5 | 3 | 70% |
| 12:03 | 589 | 478 | 430 | 303 | 121 | 120 | 147 | 381 | 710 | 26 | 100 | 100 | 29 | 26.3 | 17.2 | 62.9 | 11.5 | 20.8 | 5.4 | 4 | 70.2% |
| 12:15 | 612 | 514 | 470 | 318 | 122 | 122 | 146 | 418 | 756 | 29 | 120 | 100 | 30 | 26.2 | 20.4 | 66.2 | 5.4 | 20.1 | 8.3 | 5 | 86% |
| 12:25 | 623 | 549 | 510 | 339 | 139 | 121 | 164 | 437 | 723 | 28 | 120 | 100 | 26.4 | 26.4 | 20.4 | 66.9 | 5 | 20.8 | 7.3 | 6 | 85% |
| 12:36 | 635 | 564 | 523 | 362 | 158 | 119 | 174 | 457 | 782 | 27 | 120 | 100 | 23 | 26.5 | 20.4 | 68.4 | 4.3 | 20.2 | 7.1 | 7 | 86.4% |
| 12:55 | 662 | 642 | 605 | 373 | 120 | 120 | 168 | 475 | 851 | 28 | 140 | 100 | 28.6 | 26.6 | 23.5 | 68.1 | 1.9 | 20.9 | 9 | 8 | 94% |
| 1:10 | 676 | 679 | 636 | 412 | 158 | 120 | 183 | 492 | 863 | 28 | 140 | 100 | 24.4 | 26.7 | 23.4 | 67.4 | 1.8 | 20.6 | 10.3 | 9 | 94.5% |
| 1:20 | 691 | 677 | 617 | 483 | 118 | 119 | 152 | 503 | 882 | 28 | 140 | 100 | 29 | 26.8 | 23.5 | 67.4 | 1.8 | 20.6 | 10.3 | 9 | 94.5% |
| 1:33 | 803 | 723 | 664 | 508 | 170 | 114 | 141 | 489 | 912 | 25 | 140 | 100 | 27 | 26.8 | 23.5 | 67.5 | 1.5 | 13.9 | 17 | 11 | 95.4% |
| 1:43 | 808 | 741 | 679 | 516 | 116 | 106 | 120 | 508 | 925 | 26 | 140 | 100 | 32 | 26.9 | 23.4 | 65.7 | 1.7 | 14.6 | 18.1 | 12 | 95.0% |
| 1:48 | 828 | 751 | 687 | 528 | 134 | 112 | 125 | 513 | 937 | 26 | 140 | 100 | 31.9 | 26.9 | 23.4 | 68.8 | 1.3 | 13.1 | 16.8 | 13 | 96.0% |

Figure 17

NATURAL GAS STEAM REFORMING METHOD WITH LINEAR COUNTERCURRENT HEAT EXCHANGER

REFERENCE TO RELATED APPLICATIONS

This application is a Continuation of U.S. Ser. No. 12/902,143, filed on Oct. 11, 2010, entitled "A COMPACT NATURAL GAS STEAM REFORMER WITH LINEAR COUNTERCURRENT HEAT EXCHANGER," which itself is a Continuation-in-Part (CIP) of U.S. Ser. No. 12/165,585, entitled "SYSTEMS FOR EXTRACTING FLUIDS FROM THE EARTH AND FOR GENERATING ELECTRICITY WITHOUT GREENHOUSE GAS EMISSIONS," filed on Jun. 30, 2008, and issued on Oct. 12, 2010 as U.S. Pat. No. 7,810,565, which itself is a Continuation of U.S. Ser. No. 11/751,028, entitled "PORTABLE AND MODULAR SYSTEM FOR EXTRACTING PETROLEUM AND GENERATING POWER," filed on May 20, 2007, and issued on Jan. 26, 2010 as U.S. Pat. No. 7,650,939, the entirety of all of which are hereby incorporated by reference herein.

FIELD OF THE INVENTION

This invention relates to a natural gas steam reforming method with a linear countercurrent heat exchanger.

BACKGROUND OF THE INVENTION

The world's power demands are expected to rise 60% by 2030. The International Energy Agency (IEA) estimates that fossil fuels, including oil and natural gas, will account for 85% of the energy market by 2030. Meanwhile, trillions of dollars worth of oil remain underground in apparently "tapped-out" wells. The present invention allows much of this domestic oil to be recovered, while generating clean, distributed electric power and reducing the amount of $CO_2$ released into the atmosphere from combustion of natural gas. As both oil and clean electricity ($CO_2$-emission-free electricity) represent products whose high value today will only increase in the future, the potential profit from the present invention is quite large.

The U.S. currently produces approximately 5.1 million barrels of oil a day. Most of the oil fields in the U.S. are declining in oil recovery productivity. It has been proven that using $CO_2$ for Enhanced Oil Recovery (EOR) can increase oil recovery productivity in the declining fields. The U.S. Department of Energy (DOE) conducted several studies and has deemed $CO_2$-EOR to be the most promising solution to increase oil recovery productivity. The DOE estimates that 100 million barrels of "stranded" oil can be recovered using $CO_2$-EOR.

The DOE states that "while a mature hydrocarbon province, the U.S. still has 400 billion barrels of undeveloped technically recoverable oil resource. Undeveloped domestic oil resources still in the ground (in-place) total 1.1 Trillion barrels. Of this large in-place resource, 400 Billon barrels is estimated to be technically recoverable. This resource includes undiscovered oil, "stranded" light oil amenable to $CO_2$-EOR technologies, unconventional oil (deep heavy oil and oil sands) and new petroleum concepts (residual oil in reservoir transition zones). The U.S. oil industry, as the leader in enhanced oil recovery technology, faces the challenge of further molding this technology towards economically producing these more costly remaining domestic oil resources. Of the 582 billion barrels of oil in-place in discovered fields, 208 billion has been already produced or proven, leaving behind 374 billion barrels. A significant portion of this 374 billion barrels is immobile or residual oil left behind ("stranded") after application of conventional (primary/secondary) oil recovery technology. With appropriate enhanced oil recovery (EOR) technologies, 100 Billion barrels of this 'stranded' resource may become technically recoverable from already discovered fields."

There are tens of thousands of depleted oil and natural gas wells around the world, which collectively possess significant amounts of petroleum resources that cannot currently be extracted using conventional extraction techniques. For example, in a typical oil well, only about 30% of the underground oil is recovered during initial drilling ("primary recovery"). An additional approximately 20% may be accessed by "secondary recovery" techniques such as water flooding. In recent years, "tertiary recovery" (also known as "Enhanced Oil Recovery," or EOR) techniques have been developed to recover additional oil from depleted wells. Such tertiary recovery techniques include thermal recovery, chemical injection, and gas injection. Using current methods, these tertiary techniques allow for an additional 20% or more of the oil to be recovered.

Gas injection is one of the most common EOR techniques. In particular, carbon dioxide ($CO_2$) injection into depleted oil wells has received considerable attention owing to its ability to mix with crude oil. Since the crude oil is miscible with $CO_2$, injection of $CO_2$ renders the oil substantially less viscous and more readily extractable.

Despite the potential advantages of $CO_2$ in enhanced recovery, its use has been hampered by several factors. For instance, in order for the enhanced recovery process to be economically viable, the $CO_2$ gas must be naturally available in copious supplies at reasonable cost at or near the site of the oil well. Alternatively, $CO_2$ can be produced from industrial applications such as natural gas processing, fertilizer, ethanol and hydrogen plants where naturally occurring $CO_2$ reservoirs are not available. The $CO_2$ must then be transported over large distances via pipelines and injected at the well site. Unfortunately, such $CO_2$ pipelines are difficult and costly to construct.

For most oil fields, a $CO_2$ pipeline is not a viable option because of a mix of several problems: (a) The capital investment for building a pipeline—sometimes tens or hundreds of millions of dollars; (b) The time-frame of building a pipeline—several years; (c) The distance and terrain issues between the source and destination which either makes the pipeline impossible or simply not economical; (d) The time it takes to obtain easement rights and permits is long; and (e) The time it takes to start generating an increase in productivity—the return on investment (ROI) is too long.

For example, Anadarko Petroleum Corporation built a 125-mile $CO_2$ pipeline in Wyoming from an ExxonMobil gas plant to Salt Creek, Wyo., a 100-year old oil field. They expect to increase production from approx. 5,000 bbl/day in 2005 to approx. 30,000 bbl/day by 2010. However, the project cost hundreds of millions of dollars, and took over 5 years of planning, permitting, and construction to complete. Therefore, when faced with the hurdles and overall costs of the pipeline-delivered $CO_2$, as described above, tertiary $CO_2$ EOR simply does not make economical sense for most oil fields, especially small and medium producers scattered all over the United States and the world.

In the past, the idea of using the exhaust from fossil-fuel fired electricity plants for EOR has been widely discussed. However, the electrical industry, for reasons of economy of scale, has based itself primarily on large (500 MW to 1 GW) central power stations, located near their primary metropolitan markets. For many reasons, including notably those laid out above, as well as the fact that flue gases from conventional fossil power plants typically contain relatively low (<10%) $CO_2$ concentrations, such stations offer little potential utility for supporting EOR, especially by small producers.

Another gas that can potentially be used for enhanced recovery purposes is hydrogen. However, hydrogen has received considerably less attention than $CO_2$. Hydrogen, although somewhat soluble with oil, is believed less so than $CO_2$. Moreover, traditionally, hydrogen has been costly to produce and its use has not been justified from an economic standpoint.

The rising cost of crude oil, as high as $120 to $140 per barrel in the summer of 2008, and well over $70 per barrel in 2010 during the midst of a large economic recession, has increased interest in new enhanced oil recovery technologies. Simultaneously, the low cost of natural gas, often lower than $4/mcf, driven by the large number of natural gas discoveries as well as horizontal fracking of existing natural gas wells, has made natural gas an attractive fuel source for EOR.

Accordingly, as recognized by the present inventors, what are needed are a novel method, apparatus, and system for extracting oil from existing oil wells by utilizing $CO_2$ driver gases generated from a natural gas source. What are also needed are a method, apparatus, and system for extracting natural gas from existing natural gas wells by utilizing $CO_2$ driver gas generated from a natural gas source. As recognized by the present inventors, what is also needed is a natural gas steam reformer apparatus that is compact and portable.

Therefore, it would be an advancement in the state of the art to provide an apparatus, system, and method for generating large quantities of carbon dioxide, hydrogen and other gases from a natural gas source at low cost at or near an oil site. It would also be an advancement in the state of the art to provide a compact, portable natural gas steam reformer.

It is against this background that various embodiments of the present invention were developed.

BRIEF SUMMARY OF THE INVENTION

Accordingly, one embodiment of the present invention is a natural gas steam reforming method for generating an output gas mixture of carbon dioxide and hydrogen, including the following steps. (1) Combusting a portion of the natural gas with an oxidizing agent to generate heat, superheated steam, and a gas mixture of carbon dioxide, carbon monoxide, and hydrogen. (2) Steam reforming the gas mixture with additional superheated steam under steam-rich conditions to transform a remaining portion of the natural gas into carbon dioxide, carbon monoxide, and hydrogen. (3) Water-gas-shifting any residual carbon monoxide into additional carbon dioxide and additional hydrogen by utilizing a water-gas-shift catalyst downstream of the steam reforming step, thereby producing an effluent gas mixture that is predominantly carbon dioxide and hydrogen. (4) Boiling water in a top-to-bottom linear countercurrent heat exchanger to generate the superheated steam by transferring heat released in the water-gas-shifting step, where as the water is gravitationally and thermally stratified from top to bottom with a top portion boiling into steam, the steam continues to rise and is additionally heated in the top-to-bottom linear countercurrent heat exchanger. (5) And, utilizing the superheated steam produced as a reactant in the steam reforming step and the water-gas-shifting step to assist in reformation of the natural gas into carbon dioxide and hydrogen.

Another embodiment of the present invention is the method described above, where the steam reforming step utilizes a nickel-based catalyst.

Yet another embodiment of the present invention is the method described above, where the water-gas-shifting step utilizes a copper-based catalyst.

Yet another embodiment of the present invention is the method described above, also including the steps of acquiring data on pressure, flow, and gas composition; and controlling an automated operation of said steam natural gas reforming method by utilizing the data acquired.

Yet another embodiment of the present invention is the method described above, also including the steps of separating the $CO_2$ from the $H_2$; and generating electricity from the $H_2$.

Yet another embodiment of the present invention is the method described above, also including the steps of separating the $CO_2$ from the $H_2$; and pressurizing the $CO_2$ for use in enhanced oil recovery.

Yet another embodiment of the present invention is the method described above, also including the steps of combusting natural gas with air to boil water to generate additional superheated steam, where the additional superheated steam is utilized during said steam reforming step.

Yet another embodiment of the present invention is the method described above, also including the steps of combusting hydrogen with air to boil water to generate additional superheated steam, where the additional superheated steam is used during said steam reforming step, and where said hydrogen is separated from the gas mixture of carbon dioxide and hydrogen.

Yet another embodiment of the present invention is the method described above, also including the steps of utilizing waste heat from a generator to boil water to generate additional superheated steam, where the additional superheated steam is used during said steam reforming step.

Yet another embodiment of the present invention is the method described above, where the steam reforming step operates at a pressure of approximately 1 bar to 100 bar.

Another embodiment of the present invention is a method for converting natural gas and water into a synthesis gas mixture of carbon monoxide and hydrogen, comprising the following steps. (1) Combusting a portion of the natural gas with an oxidizing agent to generate heat, superheated steam, and a gas mixture of carbon monoxide and hydrogen, with a minority carbon dioxide. (2) Steam reforming the gas mixture under steam stoichiometric conditions with additional superheated steam to transform a remaining portion of the natural gas into the synthesis gas mixture of carbon monoxide and hydrogen, substantially free of carbon dioxide. (3) Boiling water in a top-to-bottom linear countercurrent heat exchanger to generate the superheated steam by transferring heat released in the combusting step, wherein as the water is gravitationally and thermally stratified from top to bottom with a top portion boiling into steam, the steam continues to rise and is additionally heated in the top-to-bottom linear countercurrent heat exchanger. (4) And, utilizing the superheated steam produced as a reactant in the steam reforming step to assist in reformation of the natural gas into carbon monoxide and hydrogen, thereby producing an effluent gas mixture that is predominantly carbon monoxide and hydrogen.

Another embodiment of the present invention is the method described above, also including the step of utilizing the synthesis gas mixture of carbon monoxide and hydrogen to manufacture methanol.

Yet another embodiment of the present invention is the method described above, also including the step of utilizing the synthesis gas mixture of carbon monoxide and hydrogen to manufacture dimethyl ether.

Yet another embodiment of the present invention is the method described above, where the steam reforming step utilizes a nickel-based catalyst.

Yet another embodiment of the present invention is the method described above, also including the steps of acquiring data on pressure, flow, and gas composition; and controlling an automated operation of said steam natural gas reforming method by utilizing the data acquired.

Yet another embodiment of the present invention is the method described above, also including the steps of separating the CO from the $H_2$; and generating electricity from the $H_2$.

Yet another embodiment of the present invention is the method described above, also including the steps of combusting natural gas with air to boil water to generate additional superheated steam, where the additional superheated steam is utilized during said steam reforming step.

Yet another embodiment of the present invention is the method described above, also including the steps of combusting hydrogen with air to boil water to generate additional superheated steam, where the additional superheated steam is used during said steam reforming step, and where said hydrogen is separated from the gas mixture of carbon monoxide and hydrogen.

Yet another embodiment of the present invention is the method described above, also including the steps of utilizing waste heat from a generator to boil water to generate additional superheated steam, where the additional superheated steam is used during said steam reforming step.

Another embodiment of the present invention is a method for enabling enhanced oil recovery and economical production of low-carbon emission electricity utilizing natural gas and water, comprising the following steps. (1) Combusting a portion of the natural gas with an oxidizing agent to generate heat, superheated steam, and a gas mixture of carbon dioxide, carbon monoxide, and hydrogen. (2) Steam reforming the gas mixture with additional superheated steam under steam-rich conditions to transform a remaining portion of the natural gas into carbon dioxide, carbon monoxide, and hydrogen. (3) Water-gas-shifting any residual carbon monoxide into additional carbon dioxide and additional hydrogen by utilizing a water-gas-shift catalyst downstream of the steam reforming step, thereby producing an effluent gas mixture that is predominantly carbon dioxide and hydrogen. (4) Boiling water in a top-to-bottom linear countercurrent heat exchanger to generate the superheated steam by transferring heat released in the water-gas-shifting step, where as the water is gravitationally and thermally stratified from top to bottom with a top portion boiling into steam, the steam continues to rise and is additionally heated in the top-to-bottom linear countercurrent heat exchanger. (5) Utilizing the superheated steam produced as a reactant in the steam reforming step and the water-gas-shifting step to assist in reformation of the natural gas into carbon dioxide and hydrogen. (6) Separating the carbon dioxide and hydrogen into two streams, one predominantly carbon dioxide and the other predominantly hydrogen. (7) Compressing the carbon dioxide stream and injecting it into the ground to enable enhanced oil recovery. (8) Utilizing the hydrogen stream in a power generator (such as a gas turbine, internal combustion engine, fuel cell, or other like device) to produce electricity with low carbon emissions, where some of the waste heat from the power generator may be used to boil water to generate additional superheated steam to feed the steam reforming step.

Other features, utilities and advantages of the various embodiments of the invention will be apparent from the following more particular description of embodiments of the invention as illustrated in the accompanying drawings.

BRIEF DESCRIPTION OF THE DRAWINGS

FIG. 17 shows a table of experimental test results of the natural gas steam reformer in operation.

DETAILED DESCRIPTION OF THE INVENTION

Figure 1:
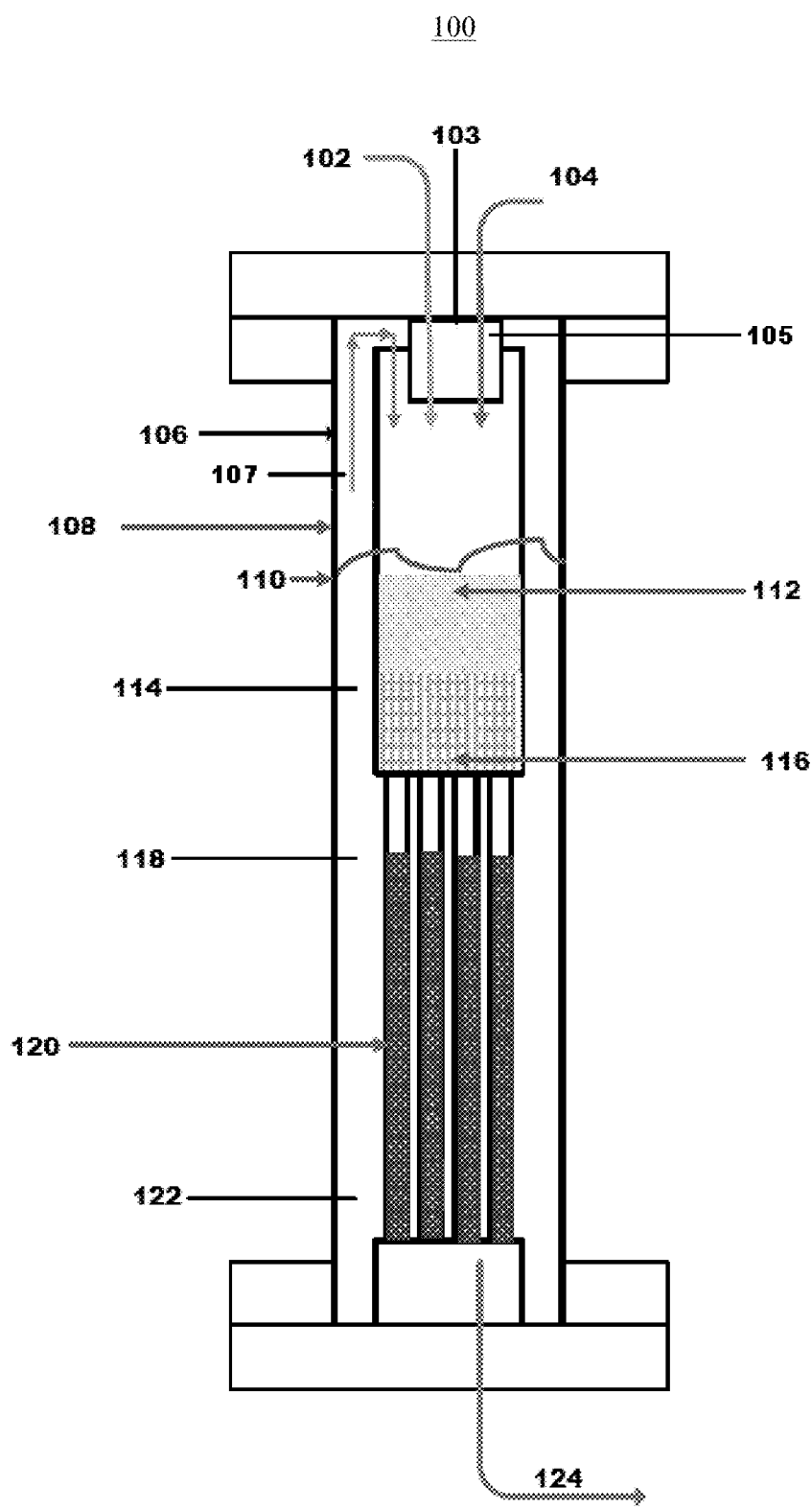
FIG. 1 shows a schematic diagram of one embodiment of a steam natural gas reformer.

The innovative design of the steam natural gas reformer according to the principles of the present invention utilizes efficient reformation of natural gas and steam. This design allows for sequestration and/or beneficial use of $CO_2$ for a variety of purposes such as the recovery of otherwise inaccessible oil, fire extinguishers, welding, pneumatic systems, biological applications, and chemical processing. The hydrogen is either burned to produce clean electricity, to be sold to utilities or used for other uses such as a chemical production, fuel cell application, or enhanced oil recovery, depending on which of these methods produce higher monetary value to the operator.

Throughout this disclosure "full scale," or any reference to a "full scale" apparatus, will refer to an apparatus that extracts 100 Bbl of incremental oil per day by producing 1 MMCF of $CO_2$ from 1 MMCF of $CH_4$. The symbols mcf, MCF, and kcf will all stand for "thousand standard cubic feet." The symbols MMCF and MMcf shall stand for "million standard cubic feet." For example, a reformer that produces 1 mcf/day of driver gas produces 1,000 standard cubic feet of driver gas per day, while a reformer that produces 1 MMCF/day of driver gas produces 1,000,000 standard cubic feet of driver gas per day. The word "day" shall mean "a day of operations," which shall be a 24-hour day, but could also be an 8-hour day, a 12-hour day, or some other amount of operational time.

Overview—Concept of the Methane Reformer

1. Oxygen-rich gas and methane-rich gas enter a combustion chamber attached to a top flange.

2. The combustion chamber feeds into a reformation chamber, which is approximately three-quarters filled with nickel-based catalyst.

3. Superheated steam ("dry steam") enters the reformation chamber.
   a. This dry steam comes from a water vessel in the reactor, where this water comes from an external water reservoir. The water in the vessel is heated from the pipes described in step 5 (the water gas shift reaction pipes), since the pipes serve as a heat exchanger.
   b. Optionally, to achieve an increased conversion factor, additional dry steam could be pumped from an external boiler. The external boiler could be same schematic as the reactor described here, except without catalysts. The boiler would consist of reacting only ambient air and methane to burn all of the methane for steam, in order to start and maintain the reaction.

4. Steam reformation occurs in the reformation chamber with the aid of nickel-based catalyst, producing carbon monoxide and hydrogen.

5. Carbon monoxide and hydrogen flow through pipes containing copper-based catalyst for a water gas shift reaction, where carbon monoxide is converted to carbon dioxide. Additional hydrogen is produced.

6. The product of the methane reformer is carbon dioxide and hydrogen, which exit the chamber from a bottom flange.

Overview of the Assembly/Schematic:

1. The system consists of a tubular reactor shell holding the reactor.
   a. Both stainless steel.
   b. Thermocouple ports can be lined along the reactor shell to detect a water level.

2. The reactor consists of a combustor, an integrated heat exchanger, boiler, reformer, gas shift reactor, and exit chamber.

3. The combustor includes a glow plug, thermocouples, and fuel and oxygen injectors.

Steam Reforming of Natural Gas

One of many illustrative scenarios is presented here to demonstrate the potential profitability of the steam natural gas reformer design. In this scenario, all of the $CO_2$ produced is used for EOR, while all of the hydrogen is used for power generation. The present invention is made up of three primary components: a steam reformer, a gas separator, and a gas turbine electrical generation system. These are discussed in turn.

Steam reformation of natural gas occurs approximately in accord with the following reaction ("steam-stoichiometric conditions"):

$$2CH_4 + O_2 + 2H_2O \rightarrow 2CO_2 + 6H_2 \, \Delta H = -32 \text{ kcal/mole if } H_2O \text{ is a gas} \tag{1}$$

In order to drive the reaction to complete reformation of natural gas into carbon dioxide and hydrogen, it is preferable to run this reaction "water-rich," or "steam-rich" conditions, which proceeds in accord with the following reaction:

$$2CH_4 + O_2 + 3H_2O \rightarrow 2CO_2 + 6H_2 + H_2O \, \Delta H = -32 \text{ kcal/mole if } H_2O \text{ is a gas} \tag{2}$$

The methane converts to $CO_2$ at a ratio of 1:1. Therefore, to get a 1,000,000 cubic feet (1 MMCF) $CO_2$/day, we need 1 MMCF of $CH_4$/day.

In this discussion, a design of a 10% of "full scale" system is presented. At 10% scale, 100,000 cubic feet (100 mcf/day) $CO_2$ is generated, which corresponds to a $CH_4$ flow rate of 70 cf/min, or 1880 L/min, or 31 L/s, or 1.42 moles/s of $CH_4$.

Reaction (2) is best done at high pressure, with 10 bar being adequate for good results. Running reaction (2) at high pressure has the advantage of producing high pressure exhaust gas, which simplifies the task of separating the $CO_2$ from the other product gases.

At 1.42 moles $CH_4$/s, reaction (1) yields a power of (16 kcal/s)(4.2 J/cal)(1.42)=95 kW. Boiling 1.5 moles of water for every mole $CH_4$ requires a power of (9.7 kcal/mole)(1.5) (1.42)(4.2)=87 kW. Therefore, there is approximately enough power in reaction (1) for it to be used to boil a sufficient quantity of water to feed itself in accord with reaction (2). The total feed rate of water into a boiler is about 4600 gm/min. About ⅓ of this water will be recovered in the condenser ("channels").

The total volume of output flow in accord with reaction (2) will be 9/2 of the $CH_4$ flow, or 8460 L/min, or 141 L/s. The condenser ("channels") consists of 14, 0.6 m long tubes, 2.5 cm in inner diameter. Total cross-sectional area is $14*(3.14)*(6.25)/4$, or 68.7 cm². At standard temperature and pressure (stp), the total rate of flow of gas through the tubes is 141,000 cm³/68.7 cm²-s, or 2052 cm/s, or 20.5 m/s. At 1 bar, with an average temp of 300° C., velocity of the gas through the tubes is 41 m/s; at 10 bar, the velocity of the gas is 4.1 m/s. Therefore, the pressure drop will be modest.

The total condenser tube ("channels") surface area would be $14*(0.6)*(3.14)*(0.025)$ m², or 0.66 m². The thickness of the tubes is about 0.001 m. Stainless steel is about 14 W/m-K. Therefore, to transfer 95 kW across the tubes requires a $\Delta T$ given by: $95000=(14)*(0.66)*(\Delta T)/0.001$, which implies that $\Delta T=10.2$ K, a modest value.

These numbers suggest that the reformer as designed would handle about 2% scale at 1 bar, and up to 20% scale at 10 bar.

In experiments done to date, using a steam natural gas reformer operating at 10 bar, gas outputs with a composition of 68% hydrogen, 2% methane, 10% CO, and 20% $CO_2$ have been obtained. Such high fraction $CO_2$ produced at pressure is much more susceptible to separation than the ~10% $CO_2$ at 1 bar produced in ordinary combustion system flue gas.

Carbon dioxide is approximately two orders of magnitude more soluble in methanol than any of methane, hydrogen, nitrogen, oxygen, or carbon monoxide. The methanol also acts as a trap, removing sulfur impurities from the gas stream. Large amounts of $CO_2$ absorbed at low temperature and high pressure at one column can then be out-gassed in nearly pure form in a second column operating at low pressure and higher temperature. In experiments done to date, using a two column combined pressure and temperature swing cycling methanol system, the inventors have shown that at 10 bar pressure and −40° C., methanol will take in to solution about 75 grams per liter of $CO_2$ from a 20% $CO_2$/80% $N_2$ gas mixture, with less than 4 grams/liter of $N_2$ entrained. In the demonstrated system, product gas purities of 92% $CO_2$ can be obtained from a 20% $CO_2$ feed, with 90% of the input $CO_2$ in the feed gas stream being captured into the product stream. The 92% pure output $CO_2$ stream can then be liquefied. In the process of liquefaction, nearly pure $CO_2$ is obtained, which can be brought to whatever high pressure is required for underground injection at little energy cost.

Let us consider the economics of a "full scale" 100 bbl/day reformer system located at or near an oil field. Depending on the field, it takes about 5-10 mcf of $CO_2$ to produce 1 barrel of oil; we will assume the more conservative 10 mcf of $CO_2$/bbl. Examining reaction (2), we see that 1 mole of $CO_2$ is produced for every mole of natural gas consumed. Thus, producing 1 MMCF of $CO_2$ will require 1 MMCF of natural gas. Currently, refined natural gas can be obtained for about $3.61/mcf (Aug. 27, 2010). Thus, 1 MMCF (1,000 mcf) of natural gas would go for a cost of about $3,600/day. Unrefined (raw) natural gas could be obtained for much cheaper, for example in places where natural gas is currently being flared, but we will use commercially priced refined natural gas in our analysis to be conservative. This would allow the production of 100 barrels of oil, which at a price of $75.17/bbl (Aug. 27, 2010), would be worth about $7,500/day.

However, in addition to the oil product, the system also produces electricity. Since from reaction (2), we see that 3 moles of hydrogen are produced for every mole of $CO_2$, at the same time that 1 MMCF of $CO_2$ are produced, the reformer also produces about 3 MMCF of hydrogen. If burned in air, these will produce about 288 MWt-hours of energy. Assuming 33% electric conversion efficiency, this translates into 96 MWe-hours of power, which at a price of $0.05/kWh, would sell for about $4,800/day. The power output of the system would be about 4 MW, which is well within the range of many gas turbine units produced by industry. It may be further noted that the revenue from electricity alone exceeds the cost of feedstock.

Adding the $4,800 per day revenue from electricity to the $7,500 earned from oil, we see that a total gross income of $12,300 per day can be obtained at a cost of $3,600 in feedstock. Assuming capital and depreciation costs of about $800 per day (assuming a per unit capital cost of $3.0 million, paid off at 10% per year), total daily operating costs would be about $4,400. Therefore, the net profit from operations would be $7,900 per day, or about $2.8 million per year per unit.

Therefore, using the principles taught by the present invention, clean electricity and oil production may become economically feasible.

Preferred System Schematics of the Steam Natural Gas Reformer

FIG. 1 shows a schematic diagram 100 of one embodiment of a steam natural gas reformer according to the principles of present invention. The steam natural gas reformer is made from two enclosures: a first enclosure 108 and a second enclosure 112. The first enclosure contains water 110, superheated steam 107, and channels 120 which contain a water-gas-shift catalyst for converting CO into $CO_2$ and $H_2$, wherein heat from hot gas flowing through the channels 120 is released into the first enclosure 108 to boil the water 110 to generate the superheated steam 107. The second enclosure 112 includes a steam inlet for receiving the superheated steam 107 from the first enclosure 108; a combustion chamber 105; and a reformation chamber 116. The combustion chamber 105 is used for combusting a portion of the natural gas from inlet 104 to generate additional superheated steam, heat, and a hot gas mixture of $CO_2$, CO, and $H_2$. The reformation chamber 116 is used for steam reforming a remaining portion of the natural gas to generate additional hot gas mixture of $CO_2$, CO, and $H_2$. The hot gas mixture is directed through the channels 120 installed in the first enclosure 108 in which the water-gas-shift catalyst converts residual CO into additional $CO_2$ and additional $H_2$, to produce an output gas mixture 124 of carbon dioxide and hydrogen.

Oxygen (or air, or another oxidizing agent) is introduced through oxygen inlet 102, while natural gas ($CH_4$) is introduced through natural gas inlet 104, into combustion chamber 105. Spark plug 103 is used to ignite the combustion chamber 105. Water enters through water inlet 106, and settles to the water level 110. As the water boils, it rises as steam 107, and enters the reformation chamber 116, along with natural gas and exhaust gas from the combustion chamber, where the steam and natural gas reform into $CO_2$, CO, and $H_2$. The hot gas mixture then flows through channels 120, where it releases heat to boil the water 110 in the first enclosure 108. In the channels 120, a water-gas-shift catalyst facilitates the conversion of any residual CO into $CO_2$. The cooled, water-gas-shifted gas then exists through outlet 124. Data acquisition devices 114, 118, 122, which could be pressure sensors, flow sensors, and gas composition sensors, are used to acquire data about the operation of the reformer in real-time, which data can be used in a control system for automated operation of the reformer by varying the oxygen-to-steam-to-natural-gas ratio.

The first enclosure 108 may operate at a temperature of approximately 200-600° C. The combustion chamber 105 of the second enclosure 112 may operate at a temperature of approximately 900-1200° C. The reformation chamber 116 of the second enclosure 112 may operate at a temperature of approximately 600-9000° C., and a pressure of approximately 1 bar to 100 bar.

The reformation chamber may contain a reformation catalyst, such as a nickel-based catalyst. The water-gas-shift catalyst may be a copper-based catalyst.

In one embodiment of the present invention, an additional external combustion chamber to generate additional heat to boil water to generate additional superheated steam, where the additional superheated steam is fed into the reformer, may be provided. The additional external combustion chamber may be fueled by the same natural gas, by hydrogen, or by another combustible material. In the case in which hydrogen is used as the fuel, the hydrogen may be obtained by separation from the output gas mixture of carbon dioxide and hydrogen. Alternatively, an additional external chamber for utilizing waste heat from a generator to boil water to generate additional superheated steam may be used to further increase a thermal efficiency of the reformer.

According to another embodiment of the present invention, the steam natural gas reformer may also be used to generate a gas mixture predominantly made of carbon monoxide and hydrogen ("syngas"). The apparatus is similar to the one described above in relation to FIG. 1, but the water-gas-shift catalyst is removed and the reformer is operated under steam-stoichiometric conditions in which water is supplied in the ratio shown in Equation 1, rather than the steam-rich conditions described in Equation 2. The apparatus is made from two enclosures. The first enclosure includes water, superheated steam, and channels in which heat from hot gas flowing through the channels release heat into the first enclosure to boil the water to generate said superheated steam. The second enclosure contains a steam inlet for receiving the superheated steam from the first enclosure; a combustion chamber; and a reformation chamber. The combustion chamber is used for combusting a portion of the natural gas to generate additional superheated steam, heat, and a mixture of CO, $H_2$, and minority $CO_2$. The reformation chamber may be used for steam reforming a remaining portion of the natural gas to generate a hot gas mixture of CO and $H_2$. The hot gas mixture is directed through the channels installed in the first enclosure, to produce an output gas mixture of carbon monoxide and hydrogen ("syngas"). The syngas may be used for a variety of purposes, including manufacturing methanol, ethanol, dimethyl ether, ethylene, propylene, polyethylene, polypropylene, and a variety of syngas derivatives.

Figure 2:
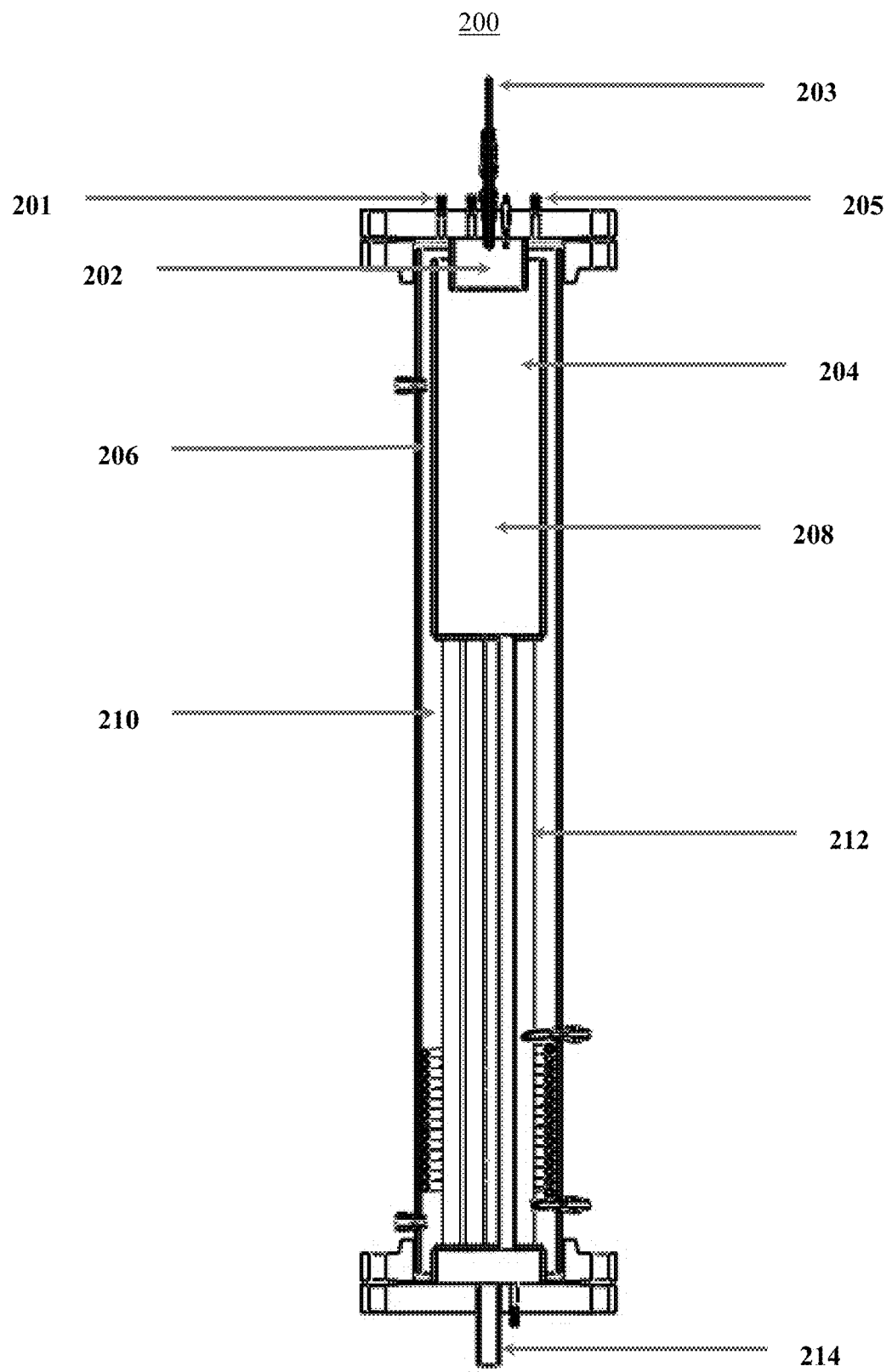
FIG. 2 shows a cutaway view of one embodiment of the steam natural gas reformer.

FIG. 2 shows a cutaway view 200 of one embodiment of the steam natural gas reformer. The steam natural gas reformer is made from two enclosures: a first enclosure 206 and a second enclosure 204. The first enclosure 206 contains channels 212 which contain a water-gas-shift catalyst. The second enclosure 204 includes a steam inlet for receiving the superheated steam from the first enclosure 206; a combustion chamber 202; and a reformation chamber 208. Oxygen (or another oxidizing agent) is introduced through oxygen inlet 201, while natural gas ($CH_4$) is introduced through natural gas inlet 205, into combustion chamber 202. Spark plug 203 is used to ignite the combustion chamber 202. Exhaust gas exits the reformer via outlet 214. Data acquisition device 210, which could be a pressure sensor, a flow sensor, and gas composition sensor, is used to acquire data about the operation of the reformer in real-time.

As shown in FIG. 2, the second enclosure may be, but does not have to be, contained within the first enclosure. The first enclosure and the second enclosure may be, but do not have to be, concentric cylinders, with the second enclosure contained within the first enclosure. The second enclosure may be, but does not have to be, located within an upper portion of the first enclosure, and the channels may be, but do not have to be, located within a lower portion of the first enclosure, partially immersed in boiling water.

Figure 3:
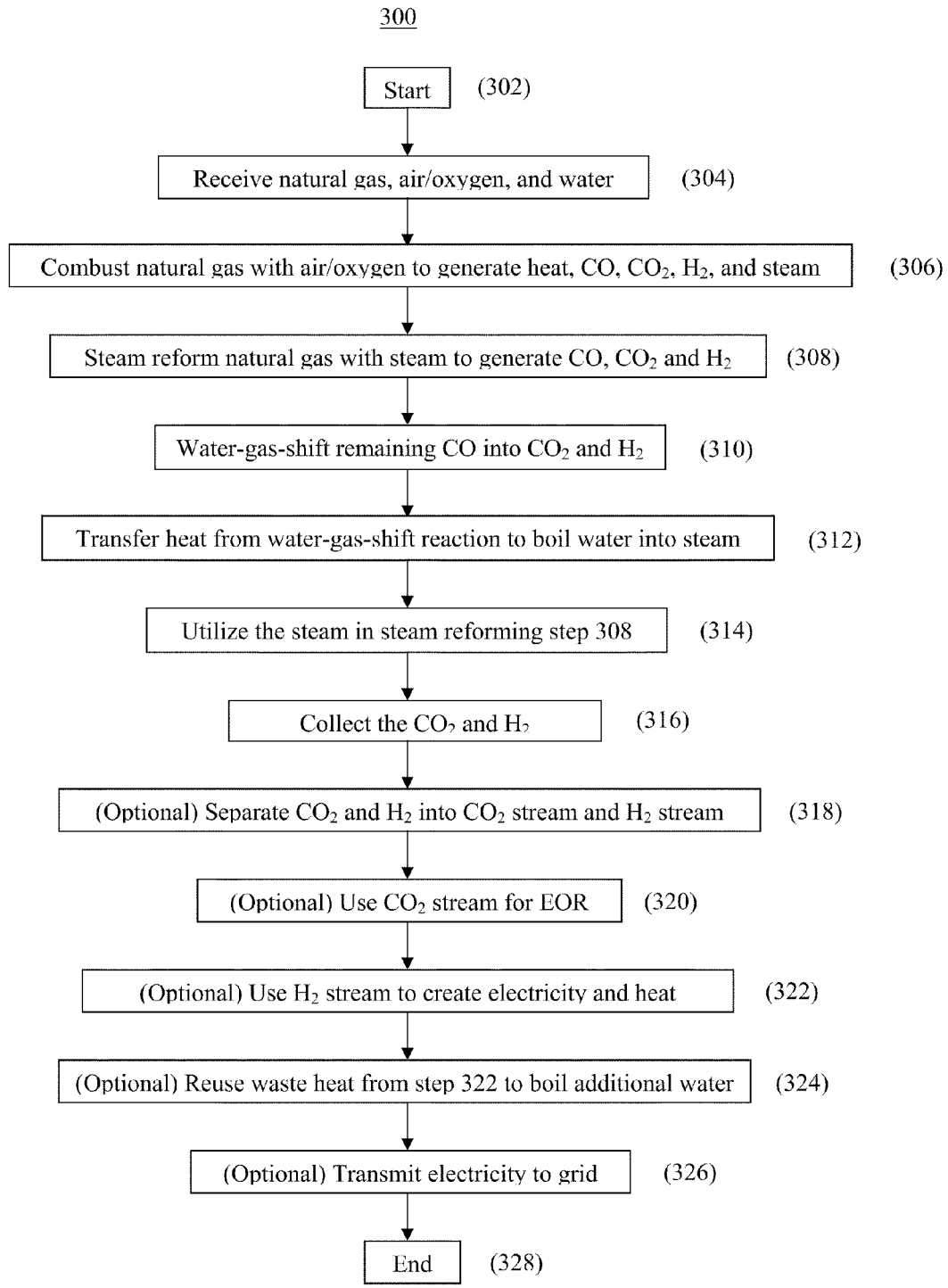
FIG. 3 shows a flowchart of a process for steam reforming natural gas into carbon dioxide driver gas and hydrogen fuel gas according to one embodiment of the present invention.

FIG. 3 shows a flowchart of a process 300 for steam reforming natural gas into carbon dioxide driver gas and hydrogen fuel gas according to one embodiment of the present invention. The process begins at step 302. Natural gas, oxidizing agent, and water are received at step 304. The oxidizing agent may be air, pure oxygen, a mixture of air and pure oxygen, or another oxidizing agent. Natural gas is combusted with the oxidizing agent to generate heat, steam, and a hot gas mixture of CO, $CO_2$, and $H_2$, as shown in step 306. Natural gas is reformed with steam to transform a remaining portion of the natural gas into CO, $CO_2$, and $H_2$, as shown in step 308. Residual CO is converted into additional $CO_2$ and additional $H_2$ by utilizing a water-gas-shift catalyst, as shown in step 310, thereby producing an effluent gas mixture that is predominantly carbon dioxide and hydrogen. Heat is transferred from the water-gas-shift reaction to boil water into steam, as shown in step 312. The steam is utilized in the steam reforming step 308, as shown in step 314, enhancing the thermal efficiency of the entire system. The $CO_2$ and $H_2$ mixture is collected in step 316. Optionally, the carbon dioxide and hydrogen mixture may be separated into two streams, one predominantly carbon dioxide and the other predominantly hydrogen, as shown in step 318. The carbon dioxide stream may be compressed and injected into the ground to enable enhanced oil recovery, as shown in step 320. The hydrogen stream may be used in a power generator (such as a gas turbine, internal combustion engine, fuel cell, or other like device) to produce electricity with low net carbon emissions, as shown in step 322. Some of the waste heat from the power generator may be used to boil water to generate steam to feed the steam reforming step, as shown in step 324. Finally, the electricity may be used locally or transmitted to the local grid, as shown in step 326. The process 300 ends in step 328.

Carbon Dioxide Separation Subsystem

According to the present invention, highly economic $CO_2$ and $H_2$ generation system is disclosed. The $CO_2$ and $H_2$ are generated from natural gas, an economical fuel source and one that is available almost anywhere. The $CO_2$ generated in the present invention may be injected into an oil well for enhanced oil recovery. The present invention also generates large supplies of hydrogen, which may be split off from the $CO_2$ product to be used for many purposes, including electrical power generation or petrochemical hydrogenation. In the future, the hydrogen may also be sold as fuel for hydrogen-electric vehicles.

Carbon dioxide is approximately two orders of magnitude more soluble in methanol than any of methane, hydrogen, nitrogen, oxygen, or carbon monoxide (which all have solubilities of the same order). The methanol also acts as a trap, removing sulfur impurities from the gas stream. In experiments done to date, the inventors have shown that at 10 bar pressure and 10° C., methanol will take into solution about 40 grams per liter of $CO_2$ from a 40% $CO_2$/60% $N_2$ gas mixture, with less than 2 grams/liter of $N_2$ entrained.

The inventors have used this data to create a system where liquid methanol is pumped in a cycle from 1 bar to 10 bar, with the gas mix being bubbled through a column on the 10 bar side, and captured gas allowed to outgas from solution on the 1 bar side. Results to date show that product gas purities of 95% $CO_2$ can be obtained, with 80% of the input $CO_2$ in the feed gas stream being captured into the product stream. The fraction captured could be increased further to better than 95% by heating the methanol in the low pressure tank to 40° C., which could be readily done using low-quality waste heat from either the steam reformer or power generation systems. Warming the methanol in this manner would increase the methanol vapor pressure in the exhaust to about 0.3 bar, but nearly all of the entrained methanol vapor could be condensed and removed by running a low-cost −18° C. refrigerator downstream of the exhaust vessel. This unit would also reduce the $CO_2$ temperature to −18° C., which is advantageous, as it allows $CO_2$ gas to be liquefied by subsequent compression to only 20 bar.

However, in order to eliminate the large majority of this compression energy work, reduce methanol recirculation pump work by an order of magnitude, and to obtain both $CO_2$ product recoveries and purities of better than 97%, a preferred system configuration may be used that uses methanol cooled to −60° C. in the absorption column. Such a column can acquire $CO_2$ in the liquid phase, forming mixtures that are more than 30% $CO_2$ by weight, with only insignificant qualities of non-$CO_2$ gases brought into solution. Upon being warmed in the desorption column to 40° C., nearly all the $CO_2$ is stripped, and removed from the system at 10 bar, making subsequent liquefaction straightforward. In the preferred embodiment, the heating of the methanol occurs at the bottom of the downflowing desorption column, with cold $CO_2$-saturated methanol on top, so that very little methanol vapor escapes with the product $CO_2$.

In the process of liquefaction, nearly pure $CO_2$ is obtained, as neither hydrogen, methane, oxygen, nitrogen, nor carbon monoxide will be liquefied at −60° C. Once the $CO_2$ is liquefied, it can be brought to whatever high pressure is required for underground injection at little energy cost.

The non-$CO_2$ product gases, which will be a mixture of hydrogen, methane, and small amounts of carbon monoxide, are sent directly to a gas turbine where it is burned to produce electricity.

Various alternative techniques may be used to separate hydrogen gas from carbon dioxide gas, in addition to the methanol-$CO_2$ separation technique described above. In one embodiment, hydrogen-carbon dioxide separation may be performed using membranes. The membranes separate molecules based on their relative permeability through various materials that may include polymers, metals, and metal oxides. The membranes are fed at elevated pressure. Permeate is collected at lower pressure while the retentate is collected at a pressure close to the feed pressure.

A membrane separation technique that may operate in conjunction with reactions at elevated temperature is the palladium membrane. This membrane, which may be fabricated using palladium alone or in combination with modifiers, allows only hydrogen to permeate. This type of membrane, when operated in a catalytic reactor, such as in a steam reformer, enhances yield by removing a reaction product from the reaction zone. Some variants are capable of operation at up to 900° C.

Another membrane separation method that may be used is a high-temperature polymer membrane. This type of membrane is directed toward $CO_2$ separation and recovery. A polymeric-metal membrane of this type can operate at up to 370° C. (versus typical polymer membrane maximum temperatures of about 150° C.), thus potentially improving process energy efficiency by eliminating a pre-cooling step.

In yet another embodiment, carbon dioxide may be separated from hydrogen by scrubbing in an amine solution. This technique may be used to remove carbon dioxide (and hydrogen sulfide) from the high-pressure gas.

Finally, in yet another embodiment, regenerable sorbents may be used to separate hydrogen gas from carbon dioxide gas. In one example of a low-cost regenerable sorption method, a sodium carbonate sorbent is used. The sodium carbonate sorbent operates cyclically, by absorbing at about 60° C. and regenerating at about 120° C.

As described in the preferred $CO_2$ separator section, processes that generate high $CO_2$ concentrations are more amenable to affordable gas separation. Elimination of diluents such as nitrogen from air greatly improves $CO_2$ capture efficiency. In addition, processes that produce $CO_2$ at elevated pressure are at an advantage for the pressure-based separation techniques.

Various gas separator modules may be used, and the present invention is not limited to the particular gas separators shown or described herein, so long as the gas separators perform at least the function of separating $CO_2$ from the rest of the driver gas.

OPERATION EXAMPLES

Figure 4:
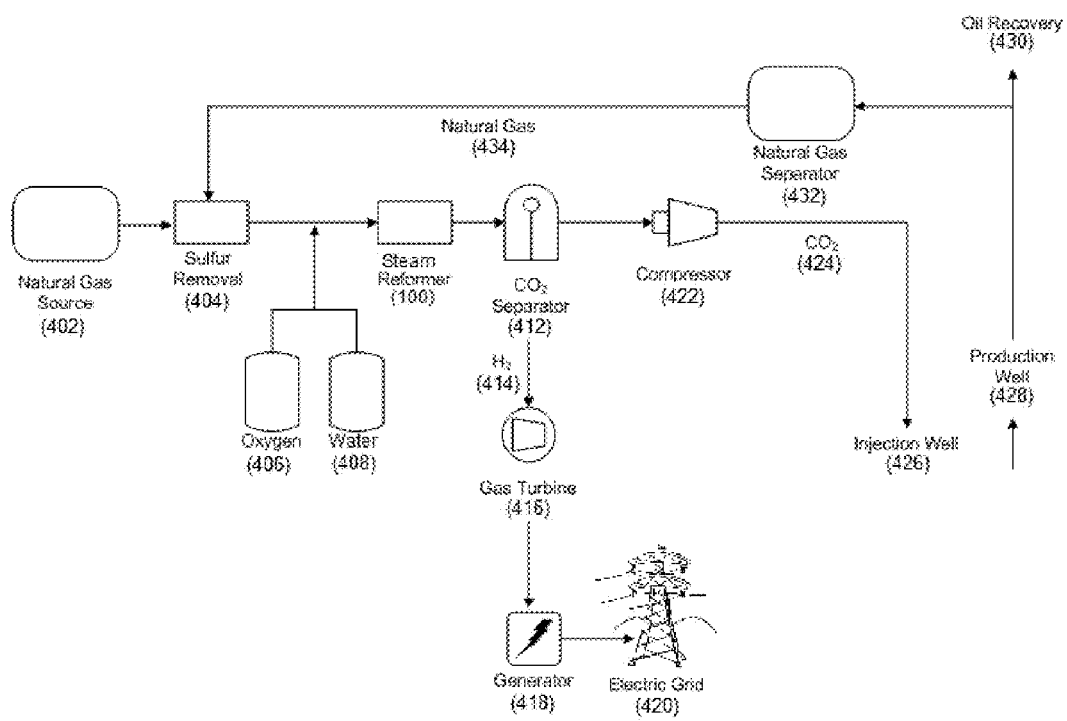
FIG. 4 illustrates an example of a use case of the natural gas reformer in which the $CO_2$ stream is used for EOR and the $H_2$ stream is used for electricity production.

FIG. 4 illustrates an example of a use case 400 of the natural gas reformer according to one embodiment of the present invention in which the $CO_2$ stream is used for EOR and the $H_2$ stream is used for electricity production. Natural gas from a natural gas source 402, either from off-site or on-site, is fed via a line into sulfur removal module 404, if necessary to remove sulfur. Desulfurized natural gas is fed via another line into methane reformer module 100. Water from water tank 408, and oxygen from oxygen tank 406, is added to methane reformer 100. The exhaust driver gas exiting the methane reformer 100 is passed through a set of heat exchangers (not shown). The cooled driver gas is passed to separator module 412, in which it is separated into a portion rich in hydrogen gas 414, and a portion rich in $CO_2$ gas. The $CO_2$-rich gas portion is sent to compressor module 422. The compressor module 422 compresses the $CO_2$-rich driver gas to a pressure appropriate for the oil well. Finally, the high pressure $CO_2$-rich driver gas 424 is injected via an injection line into injection well 426. The oil is recovered using the same injection well 426 ("Huff-and-Puff") or another production well 428. After oil recovery 430, natural gas 434 may be separated from the oil in a natural gas separator 432, and supplied to sulfur removal module 404 to provide fuel for the methane reformer. In short, local, stranded, or off-site natural gas may all be used to provide fuel to drive the methane reformer 100. The hydrogen gas 414 is fed to gas turbine 416, where it generates electricity via generator 418, which may be fed to the electric grid 420 or used on-site. Heat recovered from the natural gas reformer may be used to generate electrical or mechanical power to drive the compressor 422 or other system hardware.

If refined, desulfurized natural gas is used, no gas clean up is required. That is, the sulfur removal module 404 in FIG. 4 is not needed and may be removed. If raw natural gas is used, sulfur must generally be removed before the reformer 100 to prevent catalyst poisoning. Sulfur contained in natural gas can be removed on catalysts or sorbents such as zinc oxide, activated carbon (with chromium or copper), nickel oxide, or certain molecular sieves (13×). Some of these sorbents work at ambient temperature; others require elevated temperatures. Once captured, the sorbents may be disposed or regenerated. Many of the sorbents release trapped sulfur as hydrogen sulfide gas. If desired, the released hydrogen sulfide can be collected as elemental sulfur using methods such as the Claus process. In the Claus process, a portion of the $H_2S$ is reacted with oxygen to form $SO_2$. The $SO_2$ then reacts with the remaining $H_2S$ to form elemental sulfur and water. The elemental sulfur may be recycled or sold to the petrochemical industry for additional revenue.

In other embodiments, dry sorbents may be used to capture sulfur in the exhaust gas. Calcium oxide, magnesium oxide, and sodium carbonate are example dry sorbents that are capable of trapping sulfur gases in solid form (as sulfates or sulfites, depending on the relative oxidation conditions). A fine sorbent can be injected into the gas downstream of the reactor. Sulfur containing solids can then be collected in the cyclone or bag filter. In other embodiments, sulfur may also be removed by using a wet scrubber sub-system. Wet scrubbers can be configured in venturi, packed-column, or tray-type systems in which the cooled gases are contacted with a scrubbing solution or slurry. The resulting scrubber solution or slurry must then be disposed. The use of the methanol $CO_2$ separation system described above has the additional benefit of removing sulfur impurities from the $CO_2$ gas stream.

Figure 5:
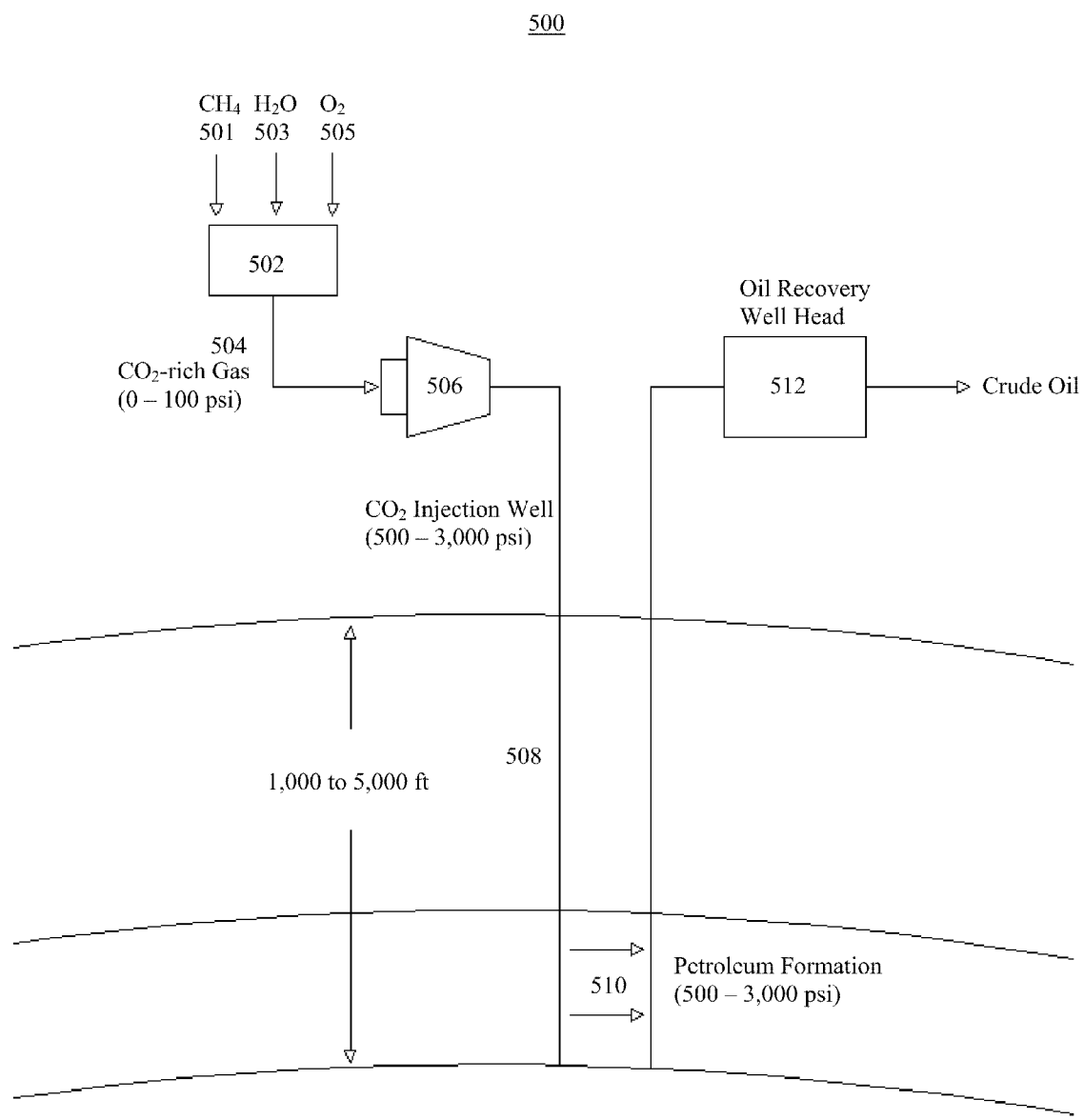
FIG. 5 illustrates another example of a use case of the natural gas reformer for the extraction of oil from an oil well in which both $CO_2$ and $H_2$ is used for oil recovery.

FIG. 5 illustrates another example of a use case 500 of the natural gas reformer according to one embodiment of the present invention for the extraction of oil from an oil well in which both $CO_2$ and $H_2$ is used for oil recovery. In FIG. 5, an oil site (which may be otherwise "depleted") having a residual amount of oil is illustrated. The simplest configuration of the system, having a reformer module and a compressor module, is shown. An in-situ reformer module 502 in accordance with the present invention generates driver gas (shown as arrow 504) from natural gas 501, water 503, and oxygen 505. As explained herein, the reformer 502 may reform or react natural gas with water with an oxidizing agent (such as air or oxygen) to form driver gas 504 which may be a hydrogen and carbon dioxide gas mixture. The driver gas 504 may be compressed by compressor 506 and pumped into an injection well 508 for removing residual oil 510 from the oil site. The driver gas 504 would impose pressure on residual underground petroleum 510 sufficient to allow it to be extracted by the same oil well, a nearby oil well 512, or other like site. As shown in FIG. 5, all of the driver gas, including both the carbon dioxide and hydrogen, may be injected into the well for the purposes of oil recovery. In an alternative embodiment, not shown in FIG. 5 and described next, all or part of the hydrogen may be separated from the carbon dioxide and, instead of being injected into the oil well, used for alternative purposes such as the generation of electric power or the hydrogenation of oil.

Preliminary laboratory test results, which measured only short-term effects of hydrogen (that is, its physical, not its chemical effects), show hydrogen to be 25% as effective, on a molecule-for-molecule basis, as $CO_2$ in reducing oil viscosity. This is a significant finding, because as shown by Reaction 2, significantly more hydrogen is produced on a molar basis than carbon dioxide. If four times as much hydrogen is produced as carbon dioxide from steam reforming, and hydrogen is 25% as effective as $CO_2$, then the total amount of hydrogen is as effective as the $CO_2$ in enhanced oil recovery, and the additional hydrogen increases the efficiency of $CO_2$-EOR by two-fold. Further, the preliminary test results did not take into account the long-term chemical effects of hydrogen-petroleum interaction (such as in-situ hydrogenation, for example), nor the potential cooperative effects of hydrogen and carbon dioxide. Thus it may be seen that carbon dioxide and hydrogen, working alone or in combination, have unique properties that can be applied to the problems of improved recovery of crude oil.

Figure 6:
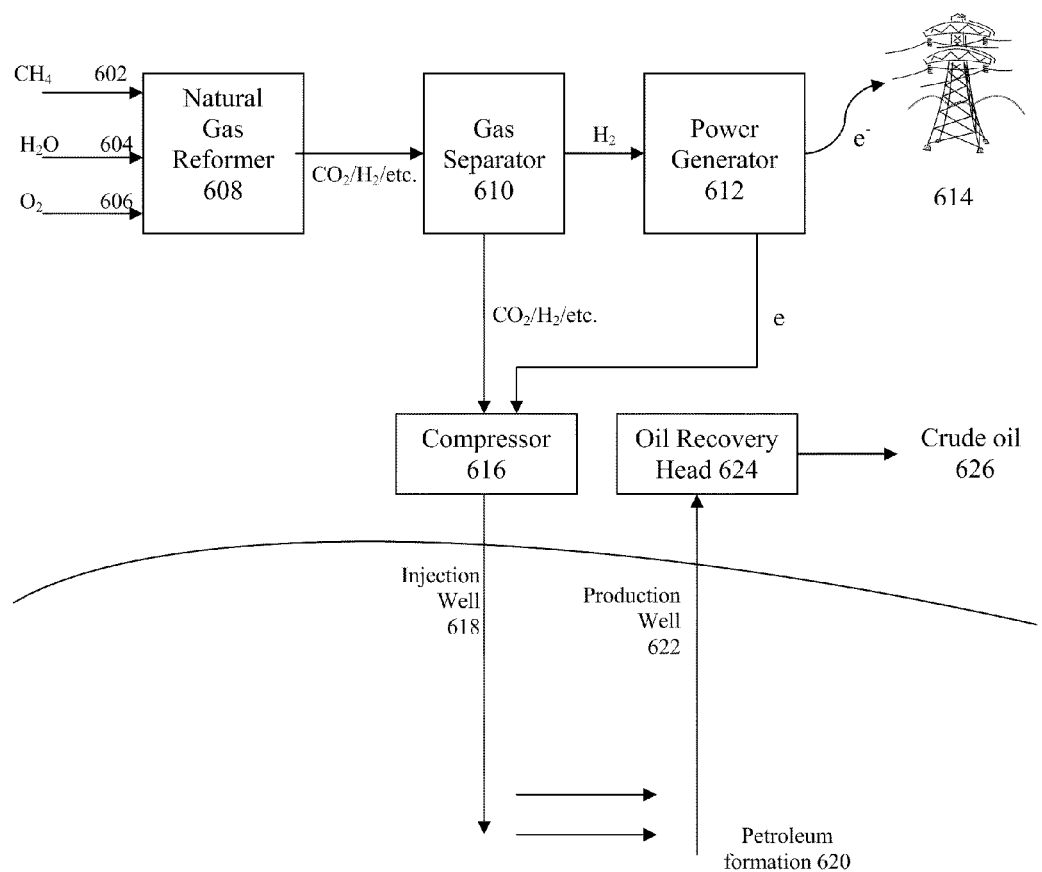
FIG. 6 illustrates yet another example of a use case of the natural gas reformer in which the $CO_2$ stream is used for EOR and the $H_2$ stream is used for electricity production.

FIG. 6 illustrates yet another example of a use case 600 of the natural gas reformer according to one embodiment of the present invention in which the $CO_2$ stream is used for EOR and the $H_2$ stream is used for electricity production. This example is illustrative only, and is not intended to limit the scope of the present invention. Natural gas 602, water 604, and an oxidizing agent (such as oxygen) 606 are fed into reformer 608. The natural gas and water may also be pre-mixed and fed into reformer 608 as a single stream. Oxygen, or another oxidizing agent, may be pre-mixed with either the natural gas, the water, or both. Generated driver gas, which may include $CO_2$, $H_2$, as well as other gases, is fed into gas separator 610, which separates a portion of the hydrogen gas from the other driver gases. A portion of the separated hydrogen gas is fed into power generator 612, which could be a gas turbine, to generate electricity. A portion of the electricity is fed into the electric grid 614. A portion of the electricity may also be used on-site, to provide power to various modules, such as the compressor 616. The rest of the driver gas is compressed by compressor 616 for injection into injection well 618. The driver gases, including the carbon dioxide as well as a portion of the hydrogen gas, and potentially other gases (such as $N_2$), pressurize the underground petroleum formation 620 and reduce its viscosity. Crude oil 626 is more amenable to recovery by oil recovery head 624 via production well 622, or other like site.

This is but one system configuration that is possible utilizing the components of the present invention, and the present invention is not limited to this particular configuration. For example, an operator who does not wish to generate electricity, and/or an operator who wishes to use all of the hydrogen gas along with the carbon dioxide gas for enhanced oil recovery, would not use a gas separator module or a power generator module, but would still use a reformer module and a compressor module. As another example, an operator who wishes to operate a hydrogenation plant near the oil well may chose to use a gas separator module to separate the hydrogen, but may chose not to use a power generator module. Such an operator would still use the other modules, and would feed the hydrogen gas to the hydrogenation plant.

That is, in one embodiment of the present invention, the hydrogen gas may be separated, and used separately from the carbon dioxide gas. For example, the hydrogen gas may be burned in a gas turbine, or sold to the petrochemical industry for crude oil refinery utilization (not illustrated), or to other parties for other purposes. In an alternative embodiment of the present invention, the hydrogen may be mixed with the carbon dioxide, and used in conjunction with the carbon dioxide for enhanced oil recovery.

In yet another embodiment of the present invention, a portion of the local oil may be used as the fuel source for the reforming reaction in place of natural gas. This is highly convenient, and under some conditions may be economical. Local, unrefined oil may be significantly cheaper than oil for the end-consumer because no transportation or processing is required. Accordingly, in one embodiment of the present invention, an oil reformer module is used in place of a natural gas reformer, in which a portion of the oil extracted from the oil well is used in a closed-loop system as a reforming fuel source.

Figure 7:
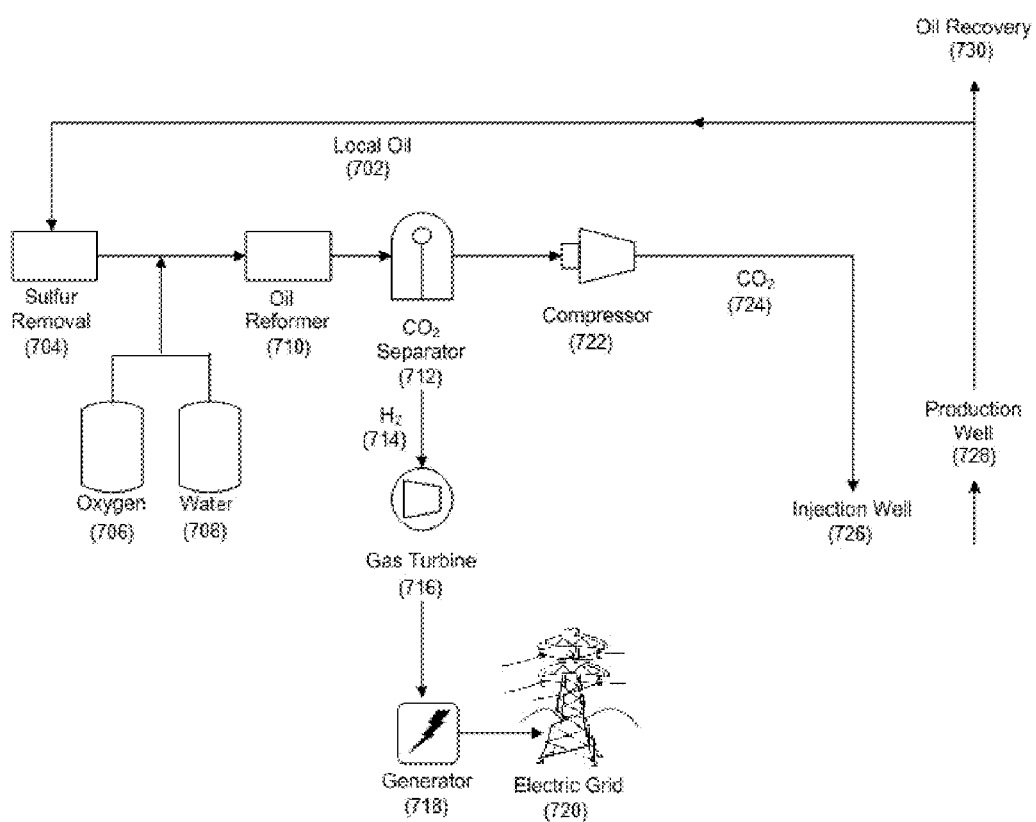
FIG. 7 illustrates another embodiment of the present invention in which a crude oil reformer utilizing local crude petroleum is used to generate $CO_2$ for EOR and $H_2$ for electricity.

Accordingly, FIG. 7 illustrates another embodiment 700 of the present invention in which a crude oil reformer 710 utilizing local crude petroleum is used to generate $CO_2$ for EOR and $H_2$ for electricity. A portion of the petroleum 702 recovered from the oil site is fed into sulfur removal module 704. Desulfurized petroleum is fed via another line into catalytic oil reformer module 710. Water from water tank 708, and oxygen from oxygen tank 706, is introduce into oil reformer module 710. The exhaust driver gas exiting the oil reformer module 710 is passed through a set of heat exchangers (not shown). The cooled driver gas is passed to separator module 712, in which it is separated into a portion rich in hydrogen gas 714, and a portion rich in $CO_2$ gas. The $CO_2$-rich gas portion is sent to compressor module 722. The compressor module 722 compresses the $CO_2$-rich driver gas to a pressure appropriate for the oil well. Finally, the high pressure $CO_2$-rich driver gas 724 is injected via an injection line into injection well 726. The oil is recovered using the same injection well 726 ("Huff-and-Puff") or another production well 728. After oil recovery 730, a portion of the recovered oil 702 is fed back into sulfur removal module 704, therefore completing the closed-loop system. A small portion of the oil recovered is sacrificed in order to extract a significant amount of oil from the oil well. The hydrogen gas 714 is fed to gas turbine 716, where it generates electricity via generator 718, which may be fed to the electric grid 720 or used on-site. Heat recovered from the local oil reformer module may be used to generate electrical or mechanical power to drive the compressor 722 or other system hardware.

Detailed Schematics of the Steam Natural Gas Reformer

Figure 8:
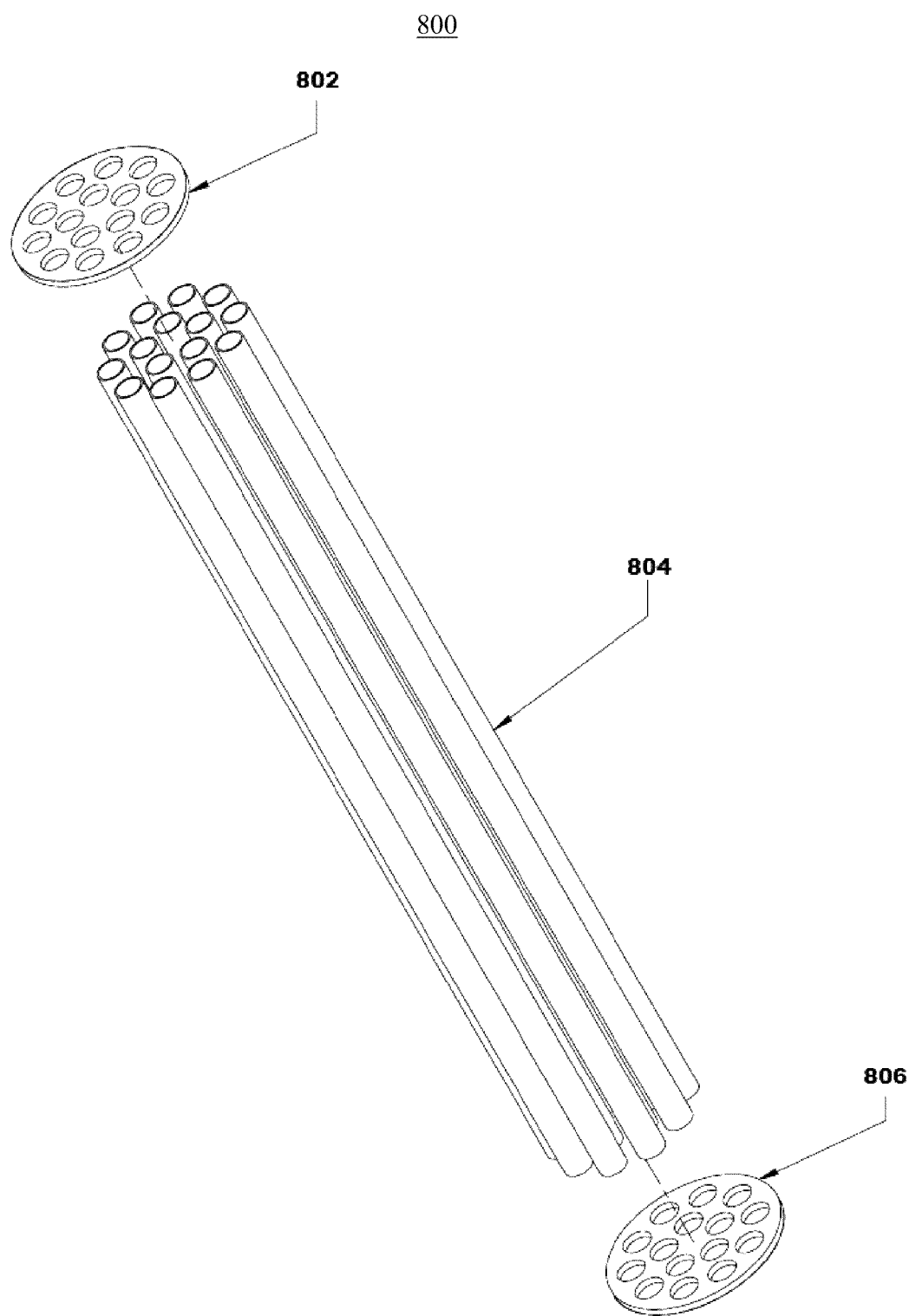
FIG. 8 shows a schematic of a tube assembly ("channels") of the steam natural gas reformer.

FIG. 8 shows a schematic 800 of a tube assembly ("channels") of the steam natural gas reformer. A top face plate 802 and a corresponding bottom face plate 806 are used to hold a set of tubes or pipes ("channels") 804 in place.

Figure 9:
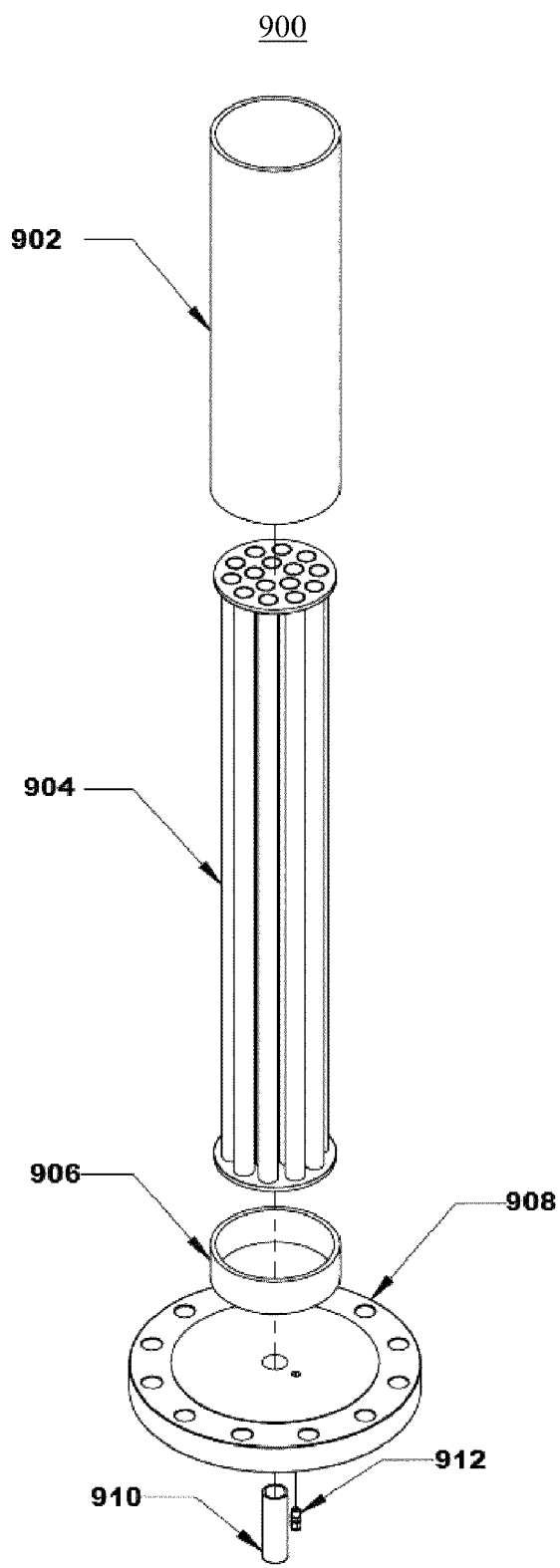
FIG. 9 shows a schematic of an inner reactor assembly ("second enclosure" and "channels") thereof.

FIG. 9 shows a schematic 900 of an inner reactor assembly ("second enclosure" and "channels") of the steam natural gas reformer. The second enclosure 902 sits on top of the channels 904. An exit chamber 906 and a bottom flange 908 hold the channels 904 and the second enclosure 902 in place. The second enclosure 902 serves as a reformation chamber containing reformation catalyst, and encloses a combustion chamber (not shown). Exhaust port 910 delivers output driver gas from the reformer. Data acquisition port 912 is used to read real-time data of the output driver gas.

Figure 10:
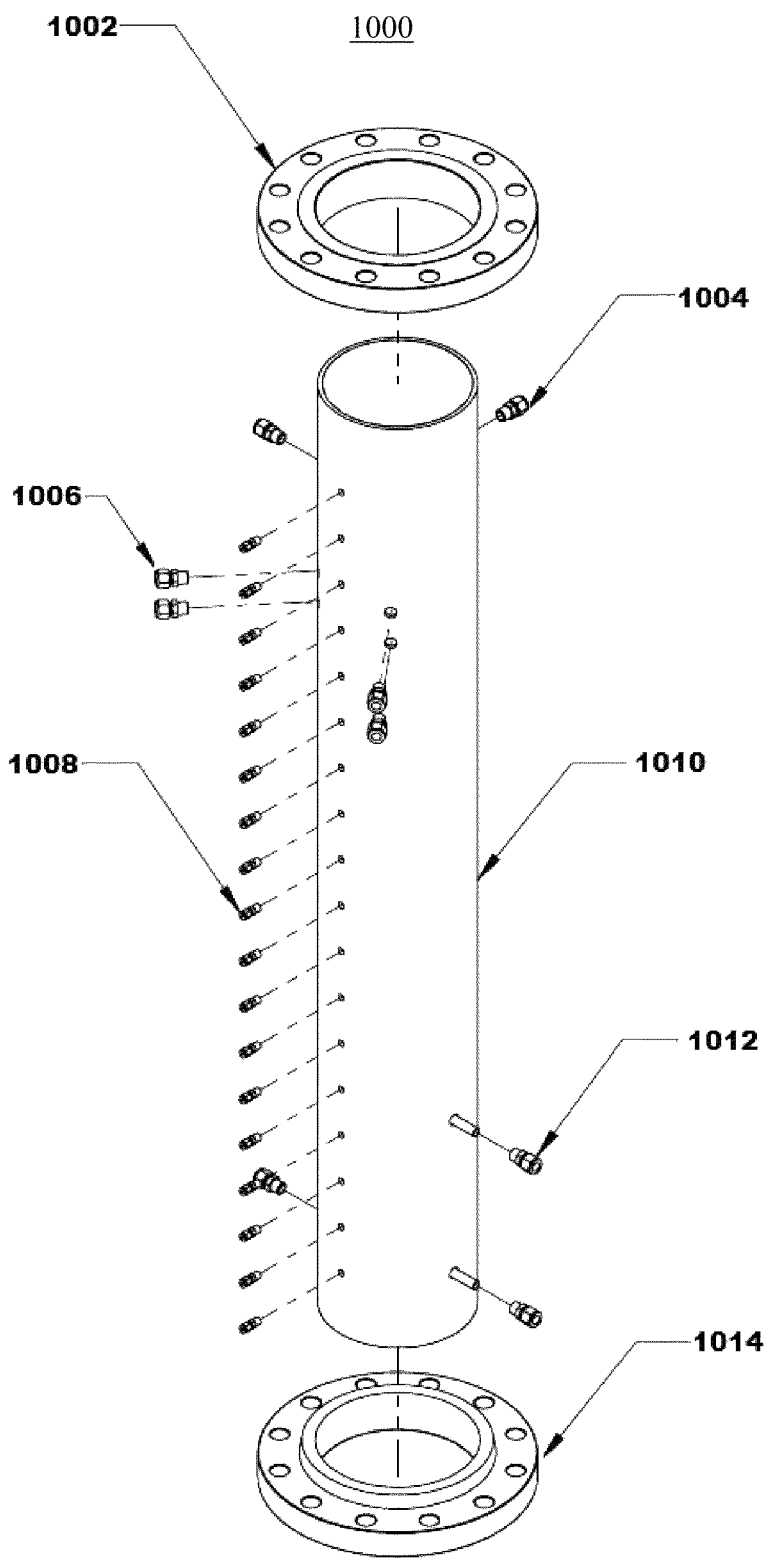
FIG. 10 shows a schematic of a shell ("first enclosure") thereof.

FIG. 10 shows a schematic 1000 of a shell ("first enclosure") 1010 of the steam natural gas reformer. A 'top-middle' flange 1002 and a 'bottom-middle' flange 1014 hold the shell ("first enclosure") 1010 in place. The channels and the second enclosure (not shown) are enclosed within the first enclosure 1010. Steam inlet port 1004 allows the connection of an additional external boiler to deliver additional superheated steam. Water level is measured via port 1006. Data acquisition ports 1008 are used to read real-time data along the entire length of the reformer. Thermocouples connected to data acquisition ports 1008 may be used to measure the water level, since all thermocouples below the water level will be at the boiling temperature of water, while the thermocouples above the water level will be at the temperature of the superheated steam. A water injection port 1012 is used to inject water into the first enclosure, and a water drain port is used to drain the water from the reformer. Emergency pressure relief ports allow relief of pressure in an emergency during build up of excess pressure.

Figure 11:
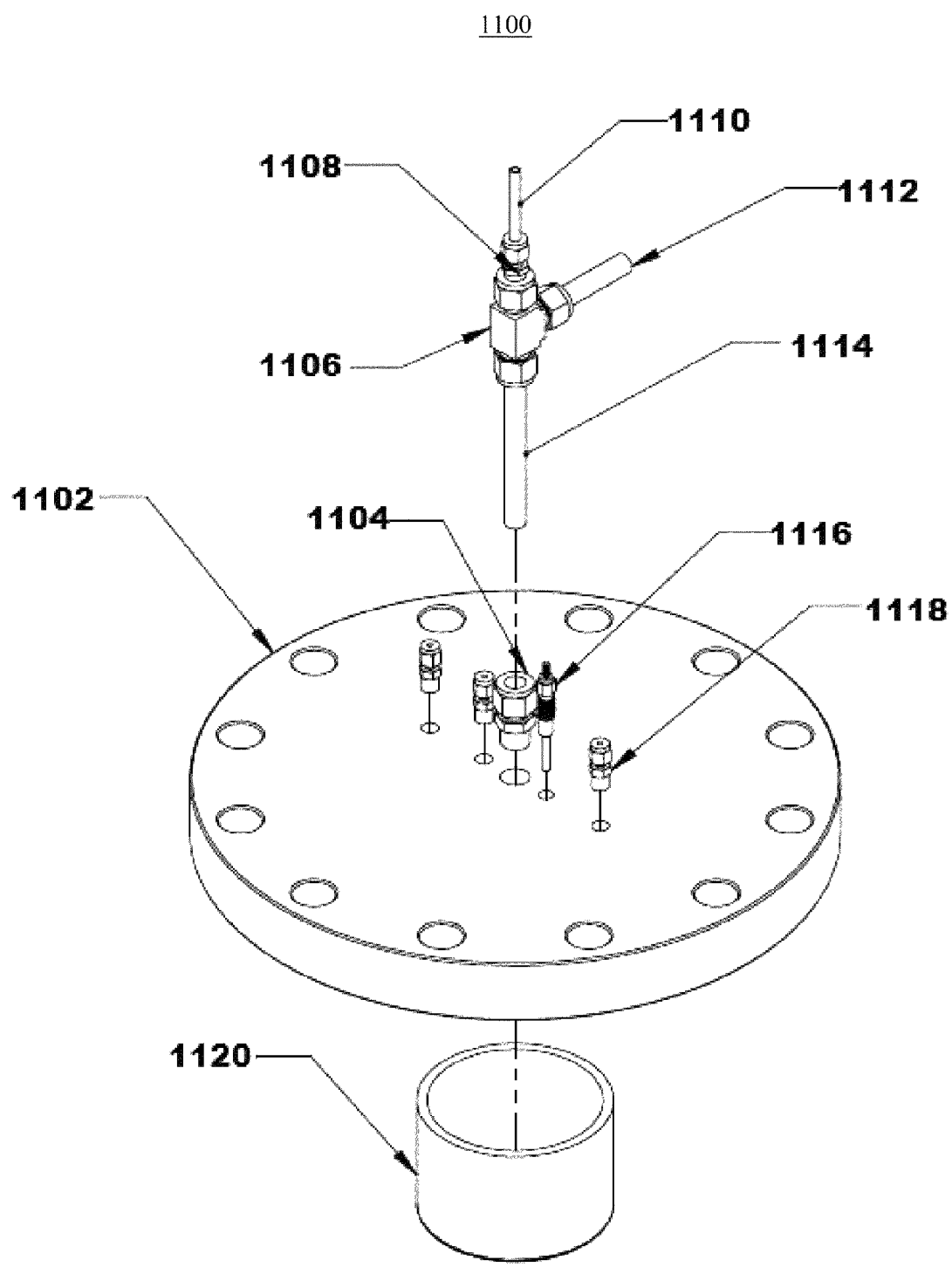
FIG. 11 shows a schematic of a top flange assembly thereof.

FIG. 11 shows a schematic 1100 of a top flange assembly of the steam natural gas reformer. The top flange assembly 1100 is made up of a top flange 1102, a 'tee' 1106, a weld fitting 1104, reducer 1108, oxidizer inlet 1110, natural gas inlet 1112, tube 1114, glow plug 1116, weld fitting 1118, and "combustion chamber" 1120. The combustion chamber 1120 fits directly above and inside the reformation chamber of the second enclosure and releases heat to the reformation chamber of the second enclosure to drive the reformation reaction occurring inside the reformation chamber of the second enclosure.

Figure 12:
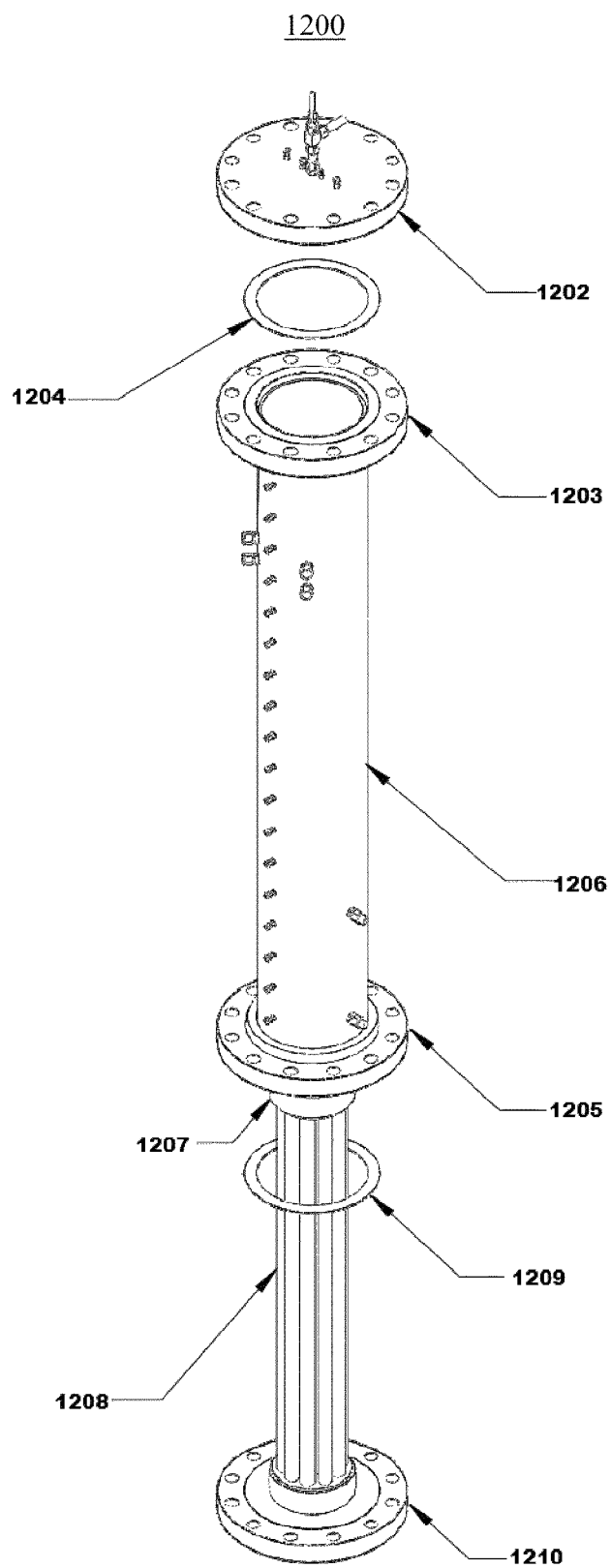
FIG. 12 shows a schematic exploded-view of the steam natural gas reformer.

FIG. 12 shows a schematic exploded-view 1200 of the steam natural gas reformer. The top flange assembly 1202 (and associated combustion chamber 1120 shown in FIG. 11), a top washer 1204, the shell ("first enclosure") 1206, a bottom washer 1209, the second enclosure 1207, the tube assembly ("channels") 1208, and the bottom flange 1210 are assembled as shown. The second enclosure 1207 and the channels 1208 become enclosed inside the first enclosure 1206 upon assembly. Also shown are the 'top-middle' flange 1203 and 'bottom-middle' flange 1205 of the shell ("first enclosure") 1206. The combustion chamber 1120 of FIG. 11 fits inside the reformation chamber of the second enclosure and releases heat to the reformation chamber of the second enclosure to drive the reformation reaction occurring inside the reformation chamber of the second enclosure (the combustion chamber 1120 is not visible in FIG. 12).

Figure 13:
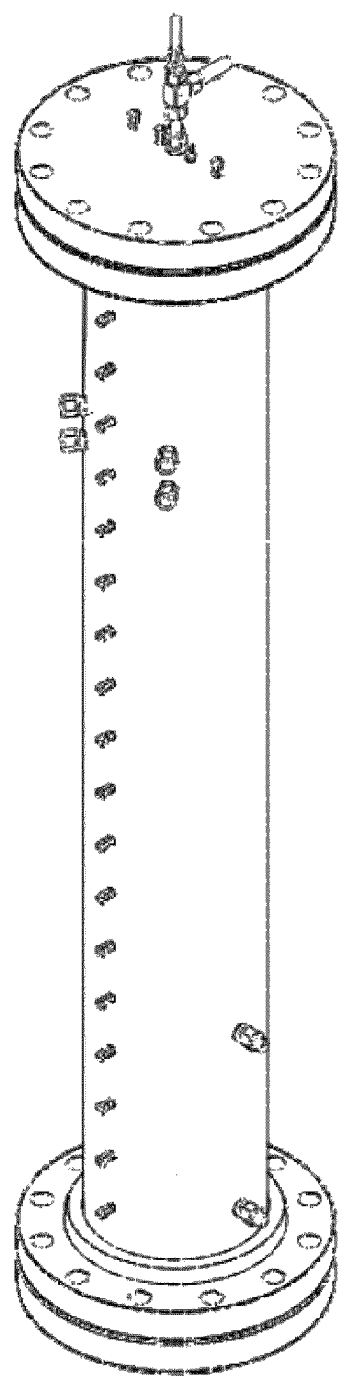
FIG. 13 shows a schematic of a fully assembled view thereof.

FIG. 13 shows a schematic of a fully assembled view 1300 of the steam natural gas reformer.

Figure 14:
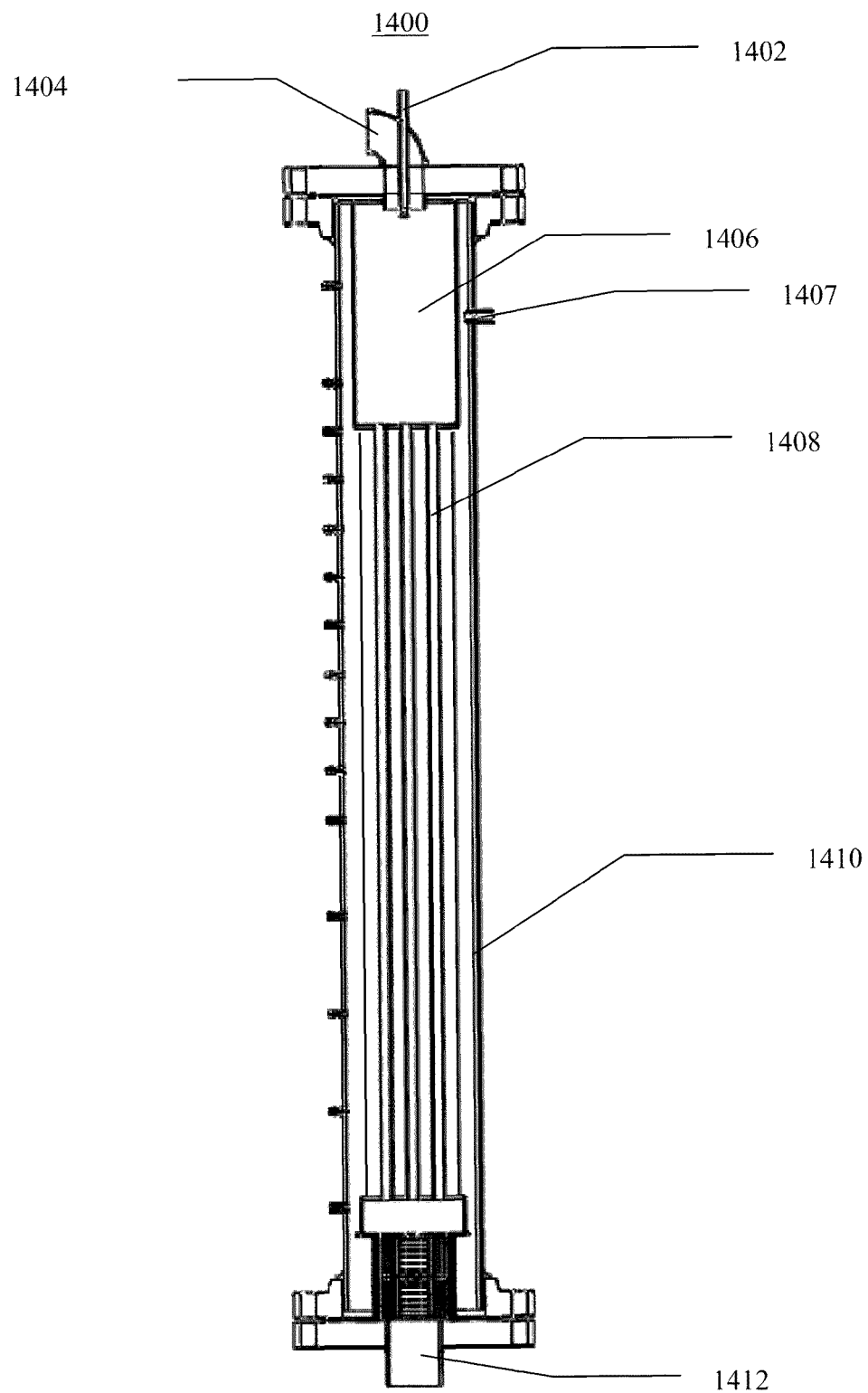
FIG. 14 shows a schematic of an external boiler made up of a third enclosure and a combustion chamber for generating additional superheated steam by combusting natural gas with ambient air.

FIG. 14 shows a schematic of an external boiler 1400 made up of a third enclosure 1410 and a combustion chamber 1406 for generating additional superheated steam by combusting natural gas with ambient air. As can be seen from FIG. 14, the external boiler 1400 is constructed nearly identically to the reformer, with the exception that no reforming catalyst or water gas shift catalyst is used. Instead of utilizing pure oxygen, the boiler utilizes ambient air via air inlet 1404 to combust the natural gas via natural gas inlet 1402 to generate enough heat to boil water and generate superheated steam. Hot exhaust gas exits the combustion chamber 1406 via channels 1408, and releases its heat to water contained in the third enclosure 1410, generating superheated steam, which exits the boiler via steam outlet 1407. Exhaust gas from the combustion reaction exits the external boiler 1400 at exhaust port 1412.

Figure 15:
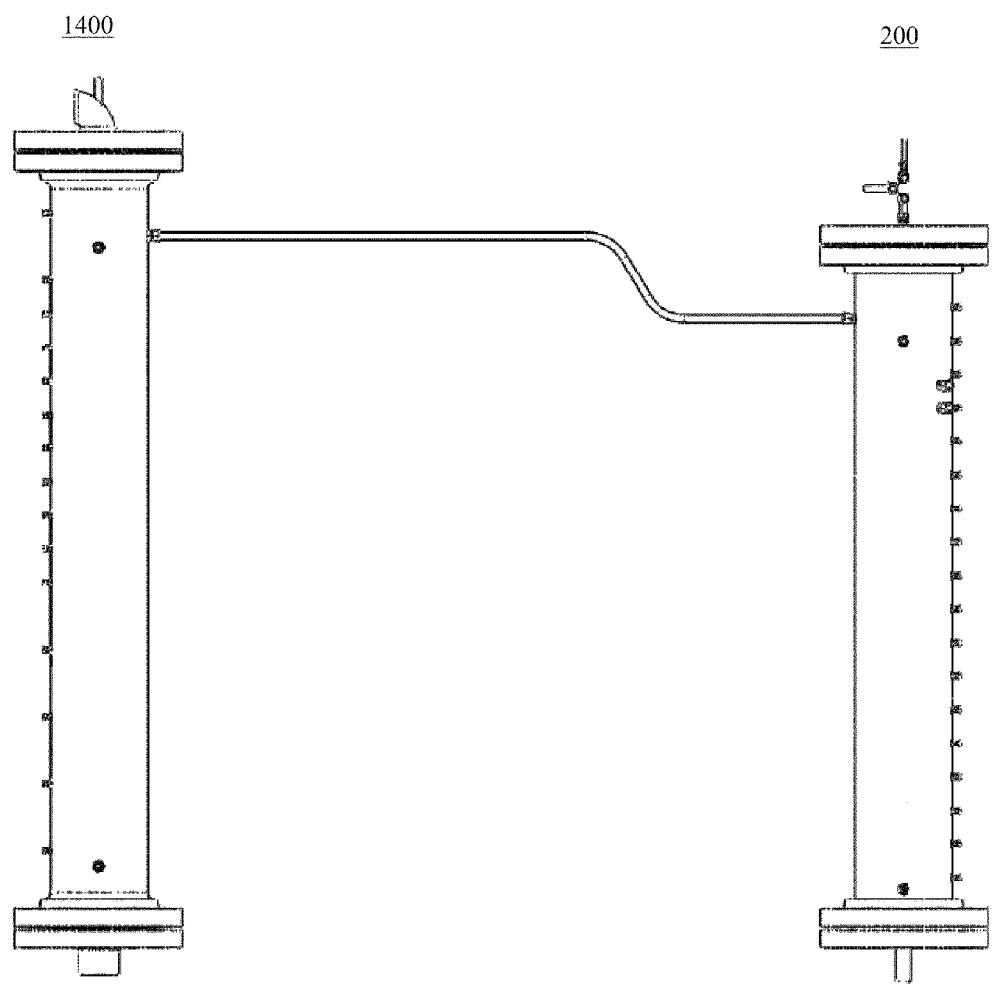
FIG. 15 shows a schematic of the natural gas steam reformer connected to the external boiler.

FIG. 15 shows a schematic of the natural gas steam reformer 200 connected to the external boiler 1400. Steam outlet 1407 on external boiler 1400 (shown in FIG. 14) is connected to a steam inlet port 1004 (shown in FIG. 10) on reformer 200. The superheated steam generated by the external boiler 1400 and delivered to the reformer 200 carries both water and heat to the reformer, thereby causing more water in the reformer to boil and generating additional superheated steam. This both helps the reformer during startup operations, as well as helps maintain the temperature, heat, and supersaturated water concentration in the reformer above what is required to drive the steam reforming reaction forward towards reformation. Advantageously, the additional superheated steam is generated without the need for oxygen. The external boiler may burn any hydrocarbon, including natural gas or hydrogen from the reformer, with ambient air. Therefore, the amount of pure oxygen that needs to be delivered to the reformer is greatly reduced by the use of an external boiler. In some embodiments, the boiler may also operate on hot exhaust gas from the gas turbine. Preferably, in order to favor the generation of carbon dioxide and hydrogen, the system is operated steam-rich with excess steam. Alternatively, in order to favor the generation of carbon monoxide and hydrogen ("syngas"), the system is operated under steam stoichiometric conditions with water provided in a stoichiometric ratio to natural gas as shown in Equation 1.

Figure 16:
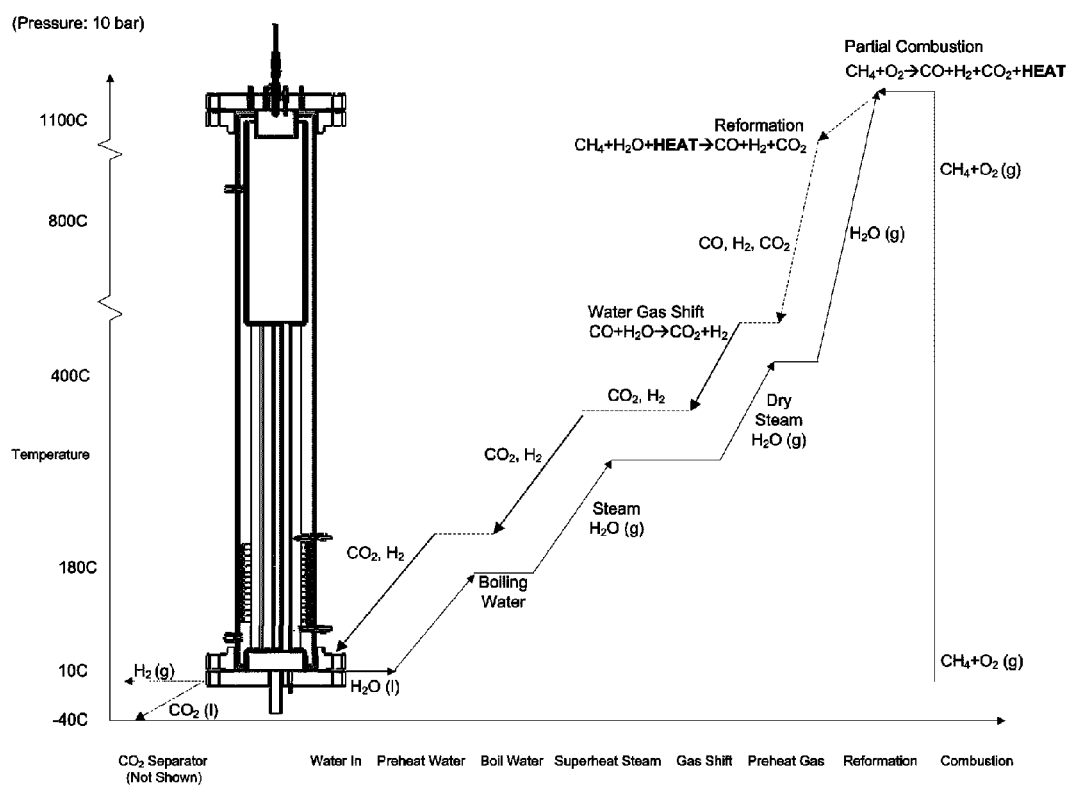
FIG. 16 shows an illustrative temperature profile of the natural gas steam reformer while in operation.

FIG. 16 shows an illustrative temperature profile of the natural gas steam reformer while in operation. Heat is transferred wherever there is a temperature difference between hot gas being generated in the combustion chamber and water/steam in the first enclosure. As shown in FIG. 16, water at ambient temperature of approximately 10° C. enters the system, where it is preheated to slightly less than 180° C. by residual heat in the hot gas in the channels. After the water is preheated, it is brought to boiling at a temperature of approximately 180° C., since at a pressure of 10 bar, water boils at approximately 180° C. The boiler operates at a temperature range of approximately 100-200° C., depending on the pressure. After the steam rises, it is further superheated into superheated ("dry") steam via the hot gas in the water-gas-shift channels and brought to approximately 400° C. The steam, now at approximately 400° C., passes through the water-gas-shift catalyst in the channels, where it reacts with any residual carbon monoxide (CO) exiting the reformation chamber. The water-gas-shift channels operate at a temperature range of approximately 200-600° C. After passing through the water-gas-shift catalyst, the steam is further superheated to approximately 800° C. before it enters the reformation chamber by exchanging heat with the hot gas exiting the reformation chamber via the channels. Inside the reformation chamber, temperatures can be in the range of approximately 600-900° C., depending on the ratio of steam:oxygen injected into the steam reformer. In the combustion chamber, natural gas combusts with oxygen at a temperature range of approximately 900-1200° C., which provides the necessary heat to drive the rest of the reformer, as well as to boil and superheat the water. As the water/steam is pre-heated throughout this process, hot gas is cooled as it exchanges heat with the water/steam. Therefore, as shown in FIG. 16, a compact, top-to-bottom, linear, countercurrent heat exchanger is shown made up of the first and second enclosures. The water/steam is pre-heated on the way up to the reformation chamber and the hot gas exiting the reformation chamber via the channels is cooled as it gives up heat to the water/steam.

After the hot gas is finished exchanging heat with the water and after it exits the reformer, it may be further thermally grounded via any appropriate thermal ground source, such as a river. The thermally-grounded gas may further pass through a condenser, and finally enter a methanol separator, which produces a liquid stream of $CO_2$ at a temperature of approximately −40° C. There may be further heat exchangers located inside the separator. In short, the driver gas is cooled by using the useful heat to pre-heat water. The example given here and shown in FIG. 16 is illustrative only of the principles of the present invention's top-to-bottom, linear, countercurrent heat exchanger design, and is not intended to limit the scope of the present invention.

FIG. 17 shows a table of experimental test results of the natural gas steam reformer in operation. As can be seen from FIG. 17, high natural gas conversion rates are achieved, as high as 95-96%. The output gas mixture comprises approximately 68% hydrogen, 20% carbon dioxide, 10% carbon monoxide, and less than 2% unconverted methane left in the output gas stream.

In one embodiment of the present invention, the system of the present invention may be used to design a Natural Gas Combined Cycle (NGCC) power plant. In one embodiment, multiple reformers may be provided in parallel "battery" arrangements, providing redundancy in case one reformer fails.

System Design Using a Modular Configuration

The present invention may also be configured as a modular system, which may include all or part of the following set of components: a steam reformer, a gas separator, a power generator, and a control system. These components may be mixed and matched depending on the particular application, and the requirements of a particular user. A steam natural gas reformer is provided as described in detail above. A gas separator module is provided that is capable of separating the $CO_2$ from the hydrogen gas. Candidate separator systems include methanol temperature and/or pressure swing, sorption beds, $CO_2$ freezers, membranes, and centrifugal separators, as described above.

A power generator module is provided that is capable of utilizing the hydrogen product separated by the gas separator to generate electricity. The power generator may be a gas turbine, an internal combustion engine, a fuel cell system, or any other apparatus or system that can generate power (electrical or mechanical or other) from hydrogen, methane, and/or carbon monoxide gas.

A control module is provided that is capable of controlling the operation of the system both automatically and with user-input. The control module may use subsurface data to automatically regulate the operation of the system via feedback control. This allows the system to operate with minimal human supervision or labor. The subsurface data may include total pressure, partial pressure of carbon dioxide, partial pressure of hydrogen, temperature, and/or viscosity of the oil. The control module may also include a set of controls for user-control of the system.

The control system may be used to control the power plant based on the local prices of electricity, natural gas, water, and the market price of crude oil. That is, if the local price of electricity has increased and/or there is a demand for more power, the control system may divert more of the hydrogen to electricity generation. The opposite condition may hold if the local price of electricity dropped or if the market price of the crude oil rose; in this case the control system may divert more of the $CO_2$ gas for EOR. This optimization operation may be performed automatically by a control module based on real-time inputs of market prices and other parameters.

According to another embodiment, the control system may be used to control the power plant based on a temperature, a pressure, and a gas composition of the driver gas in real-time by controlling an input oxygen-to-steam-to-natural-gas ratio. Such a control system may be implemented using negative feedback control on the injection of oxygen-to-steam-to-natural-gas ratio into the steam reformer.

A gas capture module is provided that is capable of re-capturing a portion of the $CO_2$ gas and recycling the gas. The gas capture module allows the $CO_2$ that is released with the oil emerging from the ground to be re-captured and sent via the compressor module underground for reuse. The gas capture module increases the overall efficiency of an oil recovery operation, because a portion of the generated $CO_2$ gas is recycled and reused. In one embodiment, a gas capture module is created by pumping the oil into a vessel with a certain amount of ullage space above the oil, and drawing suction on the ullage with another pump. This operation will lower the vapor pressure of carbon dioxide above the oil, allowing gases in solution to outgas so that they can be recycled back into the well. Various gas capture modules are within the scope of the present invention, and the present invention is not limited to the particular gas capture modules or methods shown or described here, as long as the gas capture modules or methods are capable of capturing at least a portion of the gas emerging with the oil from the oil well.

INDUSTRIAL APPLICATIONS OF THE PRESENT INVENTION

The worldwide oil industry today faces declining productivity in numerous oil fields that have reached a near-depleted state where the standard extraction methods can no longer provide profitable results.

A typical oil field goes through three distinct phases:

Phase 1—Primary recovery: The average initial recovery produces about 30% of the oil in the reservoir and is accomplished by relying on the existing underground gas pressure.

Phase 2—Secondary recovery: An additional 10-30% of the underground oil can be extracted from the reservoir using such methods as water flooding. Towards the end of Phase 1 there is a gradual decline in oil recovery productivity, leading to a transition into Phase 2, which boosts oil recovery productivity by injecting water to drive the oil out of the reservoir. When Phase 2 nears completion, however, most oil fields cannot transition into Phase 3 because it is not economically feasible to do so.

Phase 3—Enhanced Oil Recovery (EOR): Carbon dioxide ($CO_2$) gas flooding can be used in order to extract about 20% more oil from the reservoir, extending the productive life of the field by 10-25 years. When an oil field's productivity declines towards Phase 3 and enters a certain low profitability plateau, it is considered to be "depleted". At this point, the field may be capped and abandoned or otherwise minimally operated, unless it is able to utilize EOR techniques in a profitable way.

While Phase 1 and Phase 2 are not very complex and yield high profit margins, Phase 3 poses a problem for literally thousands of oil fields in the U.S. alone and many thousands more worldwide.

As discussed above, the major problem with $CO_2$-EOR is that for most oil fields, $CO_2$ is not readily available at or near the oil site. This means that the $CO_2$ must be obtained from natural or industrial sources, and delivered to the oil field over long distances, usually via a pipeline. For most oil fields, a $CO_2$ pipeline is not a viable option because of a mix of several problems, including but not limited to, the capital investment for building a pipeline—sometimes tens of millions of dollars; the time-frame of building a pipeline—several years; the distance and terrain issues between the source and destination which either make the pipeline impossible or simply not economical; and the time it takes to start generating an increase in productivity—return on investment (ROI) is long.

When faced with the hurdles and overall costs of the pipeline-delivered $CO_2$, as described above, the Phase-3 $CO_2$ EOR simply does not make economical sense for most oil fields. According to several studies conducted by the U.S. Department of Energy (quoted below), there are thousands of oil fields in the United States that cannot achieve a financially viable $CO_2$-EOR production with the currently available $CO_2$ sources and technologies, due to economic and geographic constraints with the current available $CO_2$ sources and technologies.

For example, one DOE study found that "$CO_2$ enhanced oil recovery (EOR) is usually only applied when there is an abundant $CO_2$ source near the well. This is certainly not the case in Kansas where there are hundreds of millions of barrels of oil available that is currently out of reach because there is no local source of $CO_2$." Oil fields such as the Kansas example and many others, including oil fields in Pennsylvania, Ohio, West Virginia, Kentucky, Colorado, Wyoming, California, etc. are potential places of application for the present invention.

The innovative system produces both carbon dioxide gas ($CO_2$) and hydrogen gas ($H_2$) at low cost, specifically tailored to the needs of oil fields that are facing declining productivity and require Enhanced Oil Recovery. The key factors behind the current solution to the EOR challenges are:

Reforming natural gas and water into $CO_2$ and hydrogen. Natural gas is very common, cheap and commercially available almost anywhere in large quantities, making it an ideal fuel stock.

Overall gas production cost is well below $2 per thousand cubic feet (kcf) of $CO_2$—providing a large margin to the DOE's $2/kcf $CO_2$ threshold of economic viability.

Added value from hydrogen, which may be used either to produce "green" electricity or for more efficient oil recovery.

On-site gas production at the oil field—overcoming the geographic and financial constraints of delivering $CO_2$ to the oil field, eliminating the need for expensive pipelines and large gas plants.

Modular: The system may be modular—and assembled on-site.

Green Electricity: The system produces electricity without harmful greenhouse gas emissions—proposals are being considered to create taxes on $CO_2$ emissions—the system would allow oil to be recovered without incurring these tax penalties. Further income could be obtained by selling carbon credits to others.

Hydrogen is valuable in at least three possible ways:

Hydrogen can be burned to produce electricity.

Hydrogen could be effective in extracting oil when injected into the ground along with the $CO_2$.

Hydrogen can be used in chemical processes to hydrogenate heavy oils, increasing their value, as well as for other purposes.

Macroeconomic Impact

Above, the impact of the technology on a single user was discussed, to show that it would be highly profitable. This is the key to the propagation of the technology to a large number of fields. In this section, the macroeconomic effect of the technology is discussed once it has been put into broad use, showing that it could have a major impact in both securing America's oil supply, meeting expanded electricity needs, and reducing carbon emissions.

The DOE has identified 1100 major oil reservoirs containing collectively hundreds of thousands of oil fields that would be amenable to EOR, provided a source of $CO_2$ were available. Currently, only a tiny fraction of these fields can access $CO_2$. This system would make $CO_2$ available to all of them. According to the DOE, EOR currently provides approximately 5% of U.S. oil production. Once this system is made available, this fraction could increase dramatically.

Let us consider: With over 100,000 oilfields needing $CO_2$ for EOR, it is reasonable to assume that eventually 10,000 units could be put into operation in the U.S. alone. These would collectively produce 1 million barrels of oil per day, an increase on the order of 15% of the American domestic oil production. Additional units deployed outside the U.S. would add vast additional petroleum reserves to the world's available resources, making the fuel supply of all nations more plentiful and secure.

In addition to providing carbon emission-free oil, 10,000 American units would also make available 20,000 MW (20 GW) of carbon emission-free electricity, available as desired, around the clock in the U.S. alone. Still more benefits would accrue as the technology is disseminated internationally.

Thus it can be seen that the deployment of this technology according to the principles of the present invention will meet the critical goals of securing America's oil and electricity supplies while reducing carbon emissions both here and around the globe.

As shown above, the amount of hydrogen produced by reforming sufficient natural gas to produce 1-10 MMCF/day of carbon dioxide driver gas is also sufficient to produce about 4-40 Megawatts (MW) of electric power. This is a convenient size to feed meaningful amounts of electricity into an electric power grid to support growth of demand faced by power companies in a modular fashion, without the need for massive investment in new, large-scale (approximately 250-1000 MW) facilities. Thus, the mass production and deployment of the present invention could be potentially very attractive to utility companies, allowing them to meet their customer's demand for increased supply, without the risk of major investments in large facilities, while receiving their power from a constant, regularly-available, carbon-emission-free source. This is in contrast to supplementing utility power with wind turbines, solar cells, and the like, whose power, while also carbon-emissions-free, is only available on an intermittent, irregular basis.

The Long-Felt, Unsolved Need For On-Site $Co_2$ Production For EOR

Carbon dioxide ($CO_2$) flooding potential for enhanced oil recovery (EOR) has been effectively demonstrated in the U.S., particularly in the Permian Basin of west Texas and southeast New Mexico. Much of the research on $CO_2$ flooding can be applied to other gas flooding processes. Today over 280,000 BOPD (barrels of oil per day) are being produced by $CO_2$ gas injection in the U.S. With present oil prices around $75 per barrel, this $CO_2$ oil production represents about $9 billion less in imports each year, and provides a significant number of domestic jobs as well. Out of the 350 billion barrels remaining in U.S. oil reserves, the amount of oil presently produced by $CO_2$ flooding barely scratches the surface of this resource. The potential recovery is at least an order of magnitude greater.

There are a number of reasons that $CO_2$ is not more widely used. Two significant reasons that are overcome by an on-site $CO_2$ production technology are: 1) fields too small even if relatively near a major pipeline to justify construction of a pipeline, and 2) no relatively low cost $CO_2$ available.

It is a major undertaking to install a pipeline. Hindrances include the right of way, environmental impact, guarantee of long-term users, guarantee of long-term consistent source, timeliness of availability, and size of economy. A small field will unlikely justify a pipeline of any size or distance. If $CO_2$ can be produced on site economically in quantities (1-10 MMCFD, millions of cubic feet per day) sufficient for one to a few dozen injection wells, $CO_2$-EOR would be available for any size field. As an example of the potential in the U.S., there are several isolated relatively small $CO_2$-EOR projects developed near industrial sources of $CO_2$ (for example, the Muffin Drilling in Kansas with one field, Core Energy in Michigan with 8 fields, and Chaparral Energy in Oklahoma with two fields). These range in size from one injector to 40 injectors, with production from 3 to 1100 BOPD. It requires 5-10 MCF of $CO_2$ to increase production by about 1 BBL. Future projects are looking at $50-80 per BBL for oil. If the cost of $CO_2$ is kept under 50% of the cost of the oil, and the low-end is considered, then we are looking at <$25, or $2.50 MCF (<$45/ton), for $CO_2$ if we consider 10 MCF/incremental barrel of oil.

A process that can provide $CO_2$ at a relatively low cost in about any quantity required would open up about half of the oil fields in the U.S. for miscible $CO_2$ flooding EOR. If immiscible $CO_2$ flooding EOR is included (heavy oil and/or shallow reservoir), this would open up most fields in the U.S. These two processes generally increase oil recover above conventional process by 5-15% of the original oil in place (OOIP).

A U.S. Department of Energy (DOE) report published in February 2006, which was one of the factors that inspired the inventors to develop this technology, entitled "EVALUATING THE POTENTIAL FOR 'GAME CHANGER' IMPROVEMENTS IN OIL RECOVERY EFFICIENCY FROM $CO_2$ ENHANCED OIL RECOVERY," (hereinafter, "the DOE Report"), states, inter alias "The United States has a large and bountiful storehouse of oil resources, estimated at nearly 600 billion barrels of oil in-place in already discovered oil fields. Currently used primary/secondary oil recovery methods recover only about one-third of this resource, leaving behind ("stranding") a massive target for enhanced oil recovery.

"Important steps have been taken by industry to improve the recovery efficiency in domestic oil reservoirs, notably in applying thermal enhanced oil recovery (TEOR) methods to the shallow, heavy oil fields of California and $CO_2$-EOR to the deeper, light oil fields of West Texas. To date, these improved oil recovery technologies have provided about 14 billion barrels of domestic oil production and reserves, adding about 3 percent to domestic oil recovery efficiency.

"Even including the important steps taken so far by industry, the overall domestic oil recovery efficiency remains low. This reflects production and proving of 208 billion barrels out of a resource in-place of 582 billion barrels, in already discovered fields. . . . Including all these oil resources, truly massive volumes of domestic oil—a trillion barrels—remain 'stranded,' after application of currently used primary/secondary oil recovery . . . :

"Approximately 374 billion barrels of "stranded" oil remains in already discovered domestic oil fields, even after application of traditional TEOR and $CO_2$-EOR technology." (DOE Report, page 1, emphasis added.)

The DOE Report goes on to say, inter alia:

"The causes of less-than-optimum, past-performance and only modest oil recovery by $CO_2$-EOR include the following: The great majority of past-$CO_2$ floods used insufficient volumes of $CO_2$ for optimum oil recovery, due in part to high $CO_2$ costs relative to oil prices and the inability to control $CO_2$ flow through the reservoir" (DOE Report, page 8).

The DOE Report goes on to state that these "game changer" advances in $CO_2$-EOR have not yet been developed: "However, the reader should note that significant new investments are required in research and technology development for $CO_2$-EOR to provide the increased domestic oil resources and to realize the higher oil recovery efficiencies set forth in this report" (DOE Report, pages 5 and 42).

Thus, according to the DOE, if $CO_2$ can be made more widely available, there would be a very large and highly profitable market for its application.

In addition, William A. Jones, who has over 32 years of experience in the oil and gas industry, including serving for five years on the Board of Directors for IPAMS (Independent Petroleum Association of Mountain States), has stated that based on his extensive knowledge and experience in the oil industry, that there has been a long-felt and unsolved need for on-site $CO_2$ production. As stated in the cited DOE Report, the long-felt need was a recognized problem that has existed in the art for a long period of time without solution. The need has been a persistent one that was recognized by those of ordinary skill in the art, but no solution was known. Long-felt need was identified and articulated at least since the early $CO_2$ floods in 1970s, and there were many efforts to solve the problem. Examples of previous efforts to solve the problem included transporting $CO_2$ by trucks, piping $CO_2$ from ethanol plants, piping $CO_2$ from electric power plants, building interstate networks of pipelines, portable nitrogen generation ($N_2$ is similar, but not as effective as $CO_2$), and many others. All of these attempts were found to be uneconomical and unsuccessful for most oil fields. The failure to solve the long-felt need was not due to factors such as lack of interest or lack of appreciation of an invention's potential or marketability. The long-felt need has not been satisfied by any other before this invention, which does in fact satisfy the long-felt need.

Apparatus Embodiments

Another embodiment of the present invention is a natural gas steam reforming apparatus for generating an output gas mixture of carbon dioxide and hydrogen. The apparatus is made from two enclosures. A first enclosure contains a source of water, superheated steam, and channels, located within a lower portion of the first enclosure, which contain a water-gas-shift catalyst for converting CO into $CO_2$ and $H_2$. The heat from hot gas flowing through the channels is released into the first enclosure to boil the water to generate the superheated steam. A second enclosure, contained within an upper portion of the first enclosure, includes a steam inlet for receiving the superheated steam from the first enclosure; a combustion chamber; and a reformation chamber. The combustion chamber is used for combusting a portion of the natural gas to generate additional steam, heat, and a hot gas mixture of $CO_2$, CO, and $H_2$. The reformation chamber is used for steam reforming a remaining portion of the natural gas to generate additional hot gas mixture of $CO_2$, CO, and $H_2$. The hot gas mixture is directed through the channels installed in the first enclosure in which the water-gas-shift catalyst converts residual CO into additional $CO_2$ and additional $H_2$, to produce an output gas mixture of carbon dioxide and hydrogen. In the present invention, the first and second enclosures function as a top-to-bottom linear countercurrent heat exchanger. In one embodiment of the present invention, an external third enclosure containing a combustion chamber and a boiler for combusting natural gas with ambient air may be used to boil additional water into superheated steam which is then fed into the first enclosure.

Yet another embodiment of the present invention is the apparatus described above, where the second enclosure is contained within the first enclosure.

Yet another embodiment of the present invention is the apparatus described above, where the first enclosure and the second enclosure are concentric cylinders, with the second enclosure contained within the first enclosure.

Yet another embodiment of the present invention is the apparatus described above, where the first enclosure and the second enclosure are concentric cylinders, with the second enclosure contained within the first enclosure; where the second enclosure is located within an upper portion of the first enclosure; and where said channels are located within a lower portion of the first enclosure, and are partially immersed in boiling water.

Yet another embodiment of the present invention is the apparatus described above, where the reformation chamber contains a nickel-based catalyst.

Yet another embodiment of the present invention is the apparatus described above, where the water-gas-shift catalyst is a copper-based catalyst.

Yet another embodiment of the present invention is the apparatus described above, also including one or more data acquisition devices comprising pressure sensors, flow sensors, and gas composition sensors.

Yet another embodiment of the present invention is the apparatus described above, also including one or more data acquisition devices comprising pressure sensors, flow sensors, and gas composition sensors; and a control system for automated operation of said steam natural gas reforming apparatus by utilizing data from the data acquisition devices.

Yet another embodiment of the present invention is the apparatus described above, also including a carbon dioxide separator for separating the $CO_2$ from the $H_2$; and a generator for generating electricity from the $H_2$.

Yet another embodiment of the present invention is the apparatus described above, also including a carbon dioxide separator for separating the $CO_2$ from the $H_2$; and a compressor for pressurizing the $CO_2$ for use in enhanced oil recovery.

Yet another embodiment of the present invention is the apparatus described above, also including an additional external chamber for combusting natural gas with air to boil water to generate additional superheated steam, wherein the additional superheated steam is fed into said steam natural gas reforming apparatus.

Yet another embodiment of the present invention is the apparatus described above, also including an additional external chamber for combusting hydrogen with air to boil water to generate additional superheated steam, wherein the additional superheated steam is fed into said steam natural gas reforming apparatus, and wherein said hydrogen is separated from said gas mixture of $CO_2$ and $H_2$.

Yet another embodiment of the present invention is the apparatus described above, also including an additional external chamber for utilizing waste heat from a generator to boil water to generate additional superheated steam, wherein the additional superheated steam is fed into said steam natural gas reforming apparatus.

Yet another embodiment of the present invention is the apparatus described above, where the reformation chamber operates at a pressure of approximately 1 bar to 100 bar.

Yet another embodiment of the present invention is the apparatus described above, also including an air inlet connected to the combustion chamber of the second enclosure, wherein air from the air inlet combusts with natural gas in the combustion chamber.

Yet another embodiment of the present invention is the apparatus described above, also including an oxygen inlet connected to the combustion chamber of the second enclosure, wherein pure oxygen from the oxygen inlet combusts with natural gas in the combustion chamber.

Yet another embodiment of the present invention is the apparatus described above, also including an inlet for air and oxygen connected to the combustion chamber of the second enclosure, wherein air and pure oxygen from said inlet combusts with natural gas in the combustion chamber.

Yet another embodiment of the present invention is the apparatus described above, also including a water inlet connected to the first enclosure; a natural gas inlet connected to the combustion chamber of the second enclosure; and an exhaust gas outlet connected to a downstream portion of the channels of the first enclosure for exhausting the gas mixture of $CO_2$ and $H_2$ generated by said steam natural gas reforming apparatus.

Accordingly, another embodiment of the present invention is a natural gas steam reforming apparatus for generating a syngas gas mixture of carbon monoxide and hydrogen. The apparatus is made from two enclosures. The first enclosure includes a source of water, superheated steam, and channels in which heat from hot gas flowing through the channels release heat into the first enclosure to boil the water to generate the superheated steam. The second enclosure contains a steam inlet for receiving the superheated steam from the first enclosure; a combustion chamber; and a reformation chamber. The combustion chamber is used for combusting a portion of the natural gas to generate additional steam, heat, and a mixture of CO, $H_2$, and minority $CO_2$. The reformation chamber is used for steam reforming a remaining portion of the natural gas to generate a hot gas mixture of CO and $H_2$. The hot gas mixture is directed through the channels installed in the first enclosure, to produce an output gas mixture of carbon monoxide and hydrogen ("syngas"). The syngas may be used for a variety of purposes, including manufacturing methanol, ethanol, dimethyl ether, ethylene, propylene, polyethylene, polypropylene, and a variety of syngas derivatives. In the present invention, the first and second enclosures function as a top-to-bottom linear countercurrent heat exchanger.

While the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations is not a limitation of the present invention.

While the present invention has been particularly shown and described with reference to embodiments thereof, it will be understood by those skilled in the art that various other changes in the form and details may be made without departing from the spirit and scope of the present invention.

What is claimed is:

1. A method for converting natural gas and water into a gas mixture of carbon dioxide and hydrogen, comprising the following steps:

combusting a portion of the natural gas with an oxidizing agent in a combustion chamber to generate heat, superheated steam, and a gas mixture of carbon dioxide, carbon monoxide, and hydrogen;

steam reforming the gas mixture with additional superheated steam under steam-rich conditions in a second enclosure to transform a remaining portion of the natural gas into carbon dioxide, carbon monoxide, and hydrogen;

water-gas-shifting any residual carbon monoxide into additional carbon dioxide and additional hydrogen by utilizing a water-gas-shift catalyst located in channels extending from a bottom of the second enclosure, thereby producing an effluent gas mixture that is predominantly carbon dioxide and hydrogen;

boiling water in a top-to-bottom linear countercurrent heat exchanger in a first enclosure to generate the superheated steam by transferring heat released in the water-gas-shifting step, wherein as the water is gravitationally and thermally stratified from top to bottom with a top portion boiling into steam, the steam continues to rise and is additionally heated in the top-to-bottom linear countercurrent heat exchanger which comprises said channels located in a lower portion of the first enclosure and partially immersed in boiling water, and the second enclosure contained within an upper portion of the first enclosure; and utilizing the superheated steam produced as a reactant in the steam reforming step and the water-gas-shifting step to assist in reformation of the natural gas into carbon dioxide and hydrogen.

2. The method of claim 1, wherein the steam reforming step utilizes a nickel-based catalyst.

3. The method of claim 1, wherein the water-gas-shifting step utilizes a copper-based catalyst.

4. The method of claim 1, further comprising:
acquiring data on pressure, flow, and gas composition; and
controlling an automated operation of said steam natural gas reforming method by utilizing the data acquired.

5. The method of claim 1, further comprising:
separating the $CO_2$ from the $H_2$; and
generating electricity from the $H_2$.

6. The method of claim 1, further comprising:
separating the $CO_2$ from the $H_2$; and
pressurizing the $CO_2$ for use in enhanced oil recovery.

7. The method of claim 1, further comprising:
combusting natural gas with air to boil water to generate additional superheated steam,
wherein the additional superheated steam is utilized during said steam reforming step.

8. The method of claim 1, further comprising:
combusting hydrogen with air to boil water to generate additional superheated steam,
wherein the additional superheated steam is used during said steam reforming step, and
wherein said hydrogen is separated from the gas mixture of carbon dioxide and hydrogen.

9. The method of claim 1, further comprising:
utilizing waste heat from a generator to boil water to generate additional superheated steam,
wherein the additional superheated steam is used during said steam reforming step.

10. The method of claim 1, wherein the steam reforming step operates at a pressure of approximately 1 bar to 100 bar.

11. A method for converting natural gas and water into a synthesis gas mixture of carbon monoxide and hydrogen, comprising the following steps:
combusting a portion of the natural gas with an oxidizing agent in a combustion chamber to generate heat, superheated steam, and a gas mixture of carbon monoxide and hydrogen, with a minority carbon dioxide;
steam reforming the gas mixture under steam stoichiometric conditions with additional superheated steam in a second enclosure to transform a remaining portion of the natural gas into the synthesis gas mixture of carbon monoxide and hydrogen, substantially free of carbon dioxide;
boiling water in a top-to-bottom linear countercurrent heat exchanger in a first enclosure to generate the superheated steam by transferring heat released in the combusting step, wherein as the water is gravitationally and thermally stratified from top to bottom with a top portion boiling into steam, the steam continues to rise and is additionally heated in the top-to-bottom linear countercurrent heat exchanger; and
utilizing the superheated steam produced as a reactant in the steam reforming step to assist in reformation of the natural gas into carbon monoxide and hydrogen, thereby producing an effluent gas mixture that is predominantly carbon monoxide and hydrogen,
wherein the first enclosure comprises channels in which heat from the combusting step is released into the first enclosure to boil the water to generate superheated steam, said channels located in a lower portion of the first enclosure and partially immersed in boiling water, and extending from a bottom of said second enclosure, the second enclosure contained within an upper portion of the first enclosure.

12. The method of claim 11, further comprising:
utilizing the synthesis gas mixture of carbon monoxide and hydrogen to manufacture methanol.

13. The method of claim 11, further comprising:
utilizing the synthesis gas mixture of carbon monoxide and hydrogen to manufacture dimethyl ether.

14. The method of claim 11, wherein the steam reforming step utilizes a nickel-based catalyst.

15. The method of claim 11, further comprising:
acquiring data on pressure, flow, and gas composition; and
controlling an automated operation of said steam natural gas reforming method by utilizing the data acquired.

16. The method of claim 11, further comprising:
separating the CO from the $H_2$; and
generating electricity from the $H_2$.

17. The method of claim 11, further comprising:
combusting natural gas with air to boil water to generate additional superheated steam,
wherein the additional superheated steam is utilized during said steam reforming step.

18. The method of claim 11, further comprising:
combusting hydrogen with air to boil water to generate additional superheated steam,
wherein the additional superheated steam is used during said steam reforming step, and
wherein said hydrogen is separated from the gas mixture of carbon monoxide and hydrogen.

19. The method of claim 11, further comprising:
utilizing waste heat from a generator to boil water to generate additional superheated steam,
wherein the additional superheated steam is used during said steam reforming step.

20. A method for enabling enhanced oil recovery utilizing natural gas and water, comprising the following steps:
combusting a portion of the natural gas with an oxidizing agent in a combustion chamber to generate heat, superheated steam, and a gas mixture of carbon dioxide, carbon monoxide, and hydrogen;
steam reforming the gas mixture with additional superheated steam in a second enclosure to transform a remaining portion of the natural gas into carbon dioxide, carbon monoxide, and hydrogen;
water-gas-shifting any residual carbon monoxide into additional carbon dioxide and additional hydrogen by utilizing a water-gas-shift catalyst located in channels extending from a bottom of the second enclosure, thereby producing an effluent gas mixture that is predominantly carbon dioxide and hydrogen;
boiling water in a top-to-bottom linear countercurrent heat exchanger in a first enclosure to generate the superheated steam by transferring heat released in the water-gas-shifting step, wherein as the water is gravitationally and thermally stratified from top to bottom with a top portion boiling into steam, the steam continues to rise and is additionally heated in the top-to-bottom linear countercurrent heat exchanger which comprises said channels located in a lower portion of the first enclosure and partially immersed in boiling water, and the second enclosure contained within an upper portion of the first enclosure;

boiling additional water in an external boiler by combusting the natural gas with ambient air to generate additional superheated steam which is fed into the steam reforming step;

utilizing the superheated steam in the steam reforming step and the water-gas-shifting step to assist in reformation of the natural gas into carbon dioxide and hydrogen;

separating the carbon dioxide and hydrogen into two streams, one predominantly carbon dioxide and the other predominantly hydrogen; and compressing the carbon dioxide stream and injecting it into the ground to enable enhanced oil recovery.

* * * * *